(12) United States Patent
Bietsch et al.

(10) Patent No.: US 10,984,253 B2
(45) Date of Patent: Apr. 20, 2021

(54) TRAFFIC ENFORCEMENT SYSTEM WITH TIME TRACKING AND INTEGRATED VIDEO CAPTURE

(71) Applicant: Kustom Signals, Inc., Lenexa, KS (US)

(72) Inventors: Michael Bietsch, Nevada, MO (US);
Kent F. Hayes, Olathe, KS (US);
Michael Paulson, Lawrence, KS (US);
Maurice E. Shelton, Buffalo, KS (US);
Milos Kovacevic, Novi Sad (RS);
Zoran Kovacevic, Sabac (RS)

(73) Assignee: Kustom Signals, Inc., Lenexa, KS (US)

(*) Notice: Subject to any disclaimer, the term of this patent is extended or adjusted under 35 U.S.C. 154(b) by 878 days.

(21) Appl. No.: 14/298,670

(22) Filed: Jun. 6, 2014

(65) Prior Publication Data

US 2014/0362231 A1    Dec. 11, 2014

Related U.S. Application Data

(60) Provisional application No. 61/831,971, filed on Jun. 6, 2013.

(51) Int. Cl.
*H04N 5/232* (2006.01)
*G06K 9/00* (2006.01)
(Continued)

(52) U.S. Cl.
CPC .......... *G06K 9/00785* (2013.01); *G01S 13/92* (2013.01); *G01S 17/88* (2013.01); *G02B 7/32* (2013.01); *G06T 7/20* (2013.01); *G08G 1/054* (2013.01); *H04N 5/23212* (2013.01); *H04N 5/23216* (2013.01); *H04N 5/23293* (2013.01); *H04N 5/23296* (2013.01);
(Continued)

(58) Field of Classification Search
CPC .......... H04N 5/23216; H04N 5/23212; H04N 5/23293; G06T 7/20; G06T 2207/10016; G06T 2207/30236; G06K 9/00785
See application file for complete search history.

(56) References Cited

U.S. PATENT DOCUMENTS 3,631,486 A    12/1971   Anders et al.
4,214,243 A    7/1980    Patterson
(Continued)

FOREIGN PATENT DOCUMENTS

WO    WO 97/33262    9/1997

*Primary Examiner* — Shawn S An
(74) *Attorney, Agent, or Firm* — Erickson Kernell IP, LLC

(57) ABSTRACT

A method, system, and apparatus are provided for capturing a video image and speed of a target vehicle. A ranging device detects a distance to a target vehicle. The focal distance or zoom of a video camera is set and adjusted based on the distance. The speed of travel of the vehicle is detected, displayed, and/or stored in association with a video image captured of the vehicle by the video camera. A range of distances within which to capture the video image and speed of the vehicle may be set by detecting distances between a pair of landmarks or using GPS and compass heading data. An inclinometer is provided to aid initiation of a power-conservation mode. A target tracking time may be determined and compared to a minimum tracking time period. A device certification period can be stored and displayed and the device deactivated upon expiration thereof.

16 Claims, 16 Drawing Sheets

US 10,984,253 B2

Page 2

(51) Int. Cl.
  *G06T 7/20* (2017.01)
  *G02B 7/32* (2021.01)
  *G01S 17/88* (2006.01)
  *G01S 13/92* (2006.01)
  *G08G 1/054* (2006.01)

(52) U.S. Cl.
  CPC . *H04N 5/232935* (2018.08); *H04N 5/232945* (2018.08); *G06K 2209/15* (2013.01); *G06T 2207/10016* (2013.01); *G06T 2207/30236* (2013.01)

(56) References Cited

U.S. PATENT DOCUMENTS

| | | | |
|---|---|---|---|
| 4,236,140 | A | 11/1980 | Aker et al. |
| 4,335,382 | A | 6/1982 | Brown et al. |
| 4,335,383 | A | 6/1982 | Berry |
| 4,988,994 | A | 1/1991 | Loeven |
| 5,005,213 | A | 4/1991 | Hanson et al. |
| 5,111,289 | A | 5/1992 | Lucas et al. |
| 5,111,291 | A * | 5/1992 | Erickson .......... G08B 13/19641 348/152 |
| 5,365,462 | A * | 11/1994 | McBean, Sr. .......... G01D 3/022 702/91 |
| 5,381,155 | A * | 1/1995 | Gerber .................. G08G 1/054 340/936 |
| 5,408,330 | A | 4/1995 | Squicciarini et al. |
| 5,497,419 | A | 3/1996 | Hill |
| 5,508,736 | A | 4/1996 | Cooper |
| 5,508,737 | A * | 4/1996 | Lang .................. A63B 24/0003 348/157 |
| 5,525,996 | A | 6/1996 | Aker et al. |
| 5,528,245 | A | 6/1996 | Aker et al. |
| 5,528,246 | A | 6/1996 | Henderson et al. |
| 5,563,603 | A | 10/1996 | Aker et al. |
| 5,565,871 | A | 10/1996 | Aker et al. |
| 5,570,093 | A | 10/1996 | Aker et al. |
| 5,570,127 | A | 10/1996 | Schmidt |
| 5,574,662 | A | 11/1996 | Windrem et al. |
| 5,680,178 | A | 10/1997 | Takeuchi |
| 5,689,442 | A | 11/1997 | Swanson et al. |
| 5,691,724 | A | 11/1997 | Aker et al. |
| 5,734,337 | A * | 3/1998 | Kupersmit ................ G01P 3/38 340/936 |
| 5,777,575 | A | 7/1998 | Shelton et al. |
| 5,790,188 | A | 8/1998 | Sun |
| 5,815,092 | A | 9/1998 | Gregg, III et al. |
| 5,864,481 | A | 1/1999 | Gross et al. |
| 5,912,822 | A | 6/1999 | Davis et al. |
| 5,920,348 | A * | 7/1999 | Ejima .................... G02B 7/102 348/341 |
| 5,935,190 | A | 8/1999 | Davis et al. |
| 5,938,717 | A | 8/1999 | Dunne et al. |
| 6,008,752 | A | 12/1999 | Husk et al. |
| 6,023,236 | A | 2/2000 | Shelton |
| 6,028,528 | A | 2/2000 | Lorenzetti et al. |
| 6,037,977 | A | 3/2000 | Peterson |
| 6,046,696 | A | 4/2000 | Blanco |
| 6,088,635 | A | 7/2000 | Cox et al. |
| 6,278,834 | B1 | 8/2001 | Yagi et al. |
| 6,389,340 | B1 | 5/2002 | Rayner |
| 6,411,874 | B2 * | 6/2002 | Morgan ................ B60Q 1/2611 340/468 |
| 6,417,796 | B1 | 7/2002 | Bowlds |
| 6,501,418 | B1 | 12/2002 | Aker |
| 6,518,881 | B2 | 2/2003 | Monroe |
| 6,580,373 | B1 | 6/2003 | Ohashi |
| 6,580,386 | B1 | 6/2003 | Aker et al. |
| 6,624,611 | B2 | 9/2003 | Kirmuss |
| 6,630,884 | B1 | 10/2003 | Shanmugham |
| 6,744,379 | B1 | 6/2004 | Aker et al. |
| 6,831,556 | B1 | 12/2004 | Boykin |
| 6,831,593 | B2 | 12/2004 | Aker et al. |
| 6,853,314 | B1 | 2/2005 | Aker et al. |
| 6,894,717 | B2 | 5/2005 | Bakewell |
| 6,970,183 | B1 | 11/2005 | Monroe |
| 7,068,212 | B2 | 6/2006 | Aker et al. |
| 7,091,901 | B2 | 8/2006 | Shelton |
| 7,190,882 | B2 | 3/2007 | Gammenthaler |
| 7,676,372 | B1 * | 3/2010 | Oba ..................... G09B 21/009 434/169 |
| 8,348,996 | B2 | 1/2013 | Tuval et al. |
| 8,401,240 | B2 * | 3/2013 | Dixon ..................... G01S 11/12 382/107 |
| 2002/0186148 | A1 | 12/2002 | Trajkovic et al. |
| 2002/0186297 | A1 | 12/2002 | Bakewell |
| 2003/0080878 | A1 | 5/2003 | Kirmuss |
| 2003/0081121 | A1 | 5/2003 | Kirmuss |
| 2003/0081127 | A1 | 5/2003 | Kirmuss |
| 2003/0081128 | A1 | 5/2003 | Kirmuss |
| 2003/0081942 | A1 | 5/2003 | Meinyk et al. |
| 2003/0095688 | A1 | 5/2003 | Kirmuss |
| 2003/0197804 | A1 * | 10/2003 | Ito ..................... H04N 5/23212 348/345 |
| 2004/0189831 | A1 | 9/2004 | Shibatani et al. |
| 2005/0062642 | A1 | 3/2005 | Aker et al. |
| 2005/0253749 | A1 | 11/2005 | Shelton et al. |
| 2007/0146484 | A1 * | 6/2007 | Horton ............... A63B 24/0003 348/159 |
| 2009/0079960 | A1 | 3/2009 | Chung |
| 2010/0042350 | A1 | 2/2010 | de Wild et al. |
| 2010/0201829 | A1 | 8/2010 | Skoskiewicz et al. |
| 2012/0078356 | A1 | 3/2012 | Fish et al. |
| 2012/0140080 | A1 * | 6/2012 | Taylor .................... G01C 21/00 348/148 |
| 2012/0194357 | A1 | 8/2012 | Ciolli |
| 2012/0209472 | A1 | 8/2012 | Schofield et al. |
| 2013/0304200 | A1 | 11/2013 | McLean et al. |

* cited by examiner

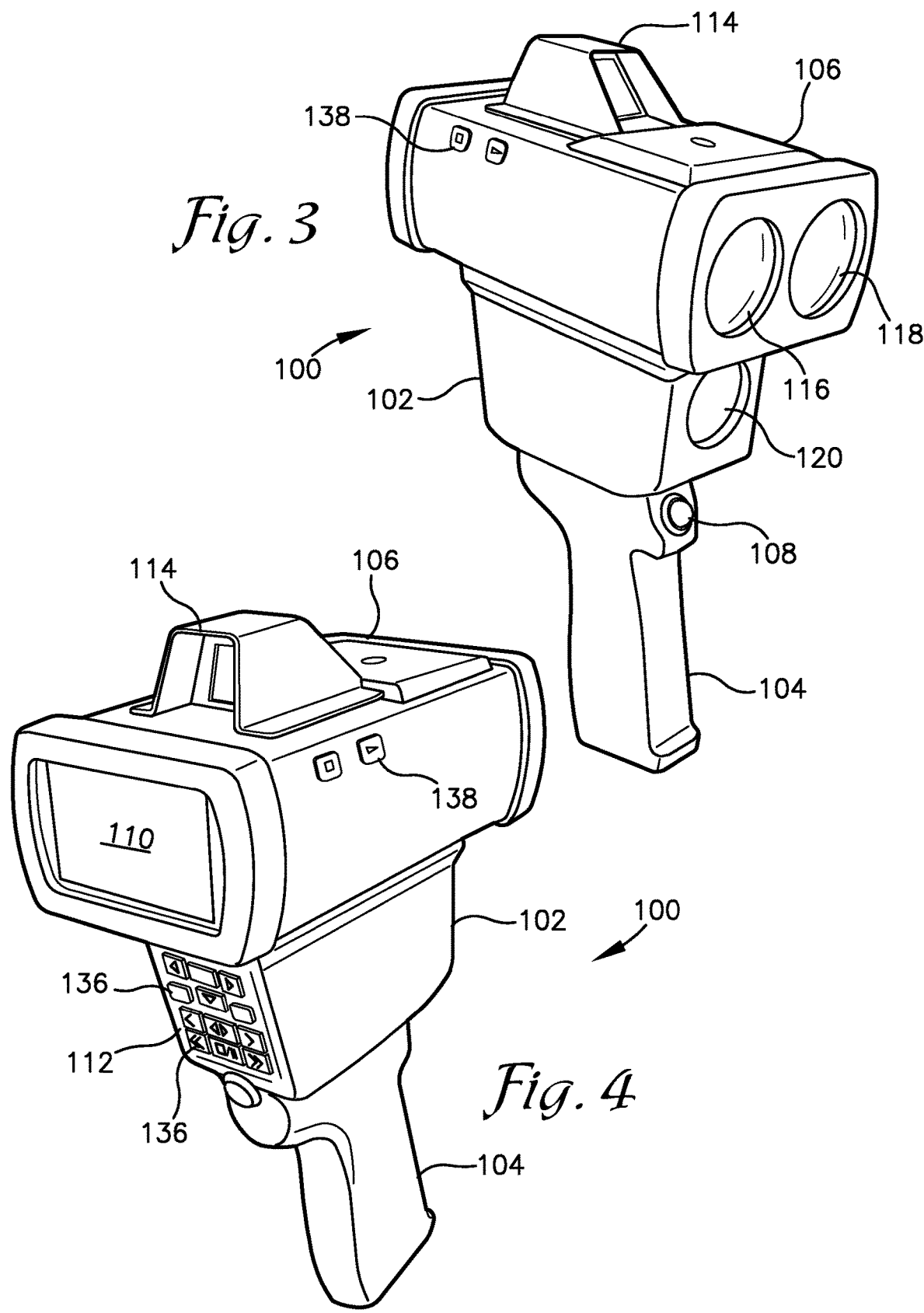

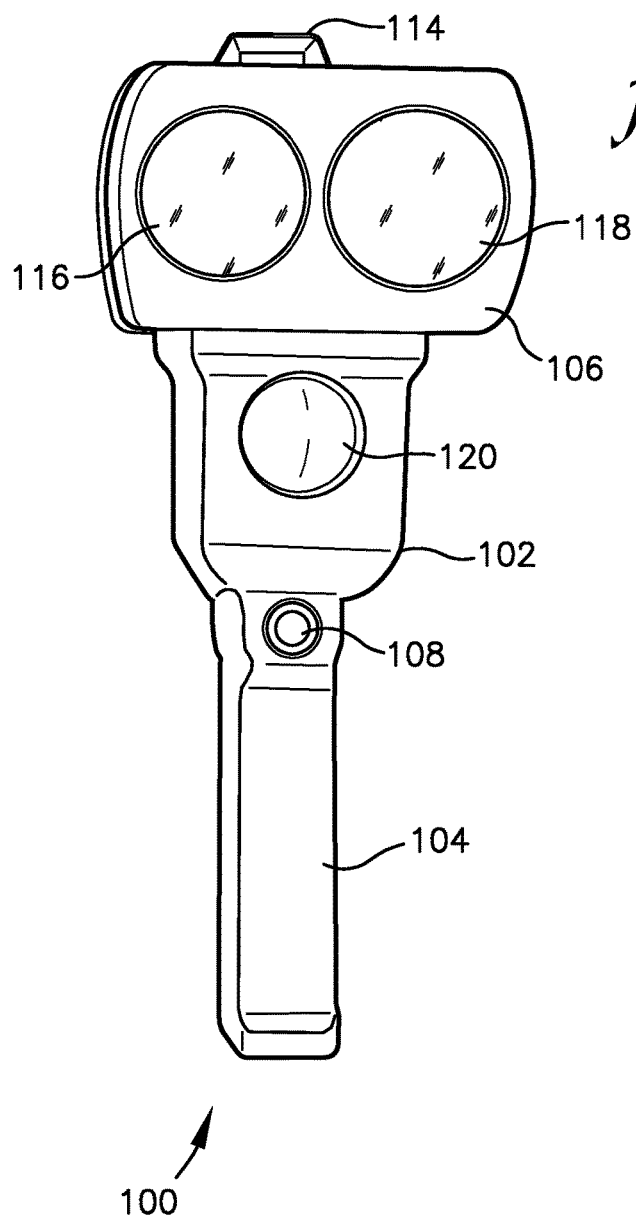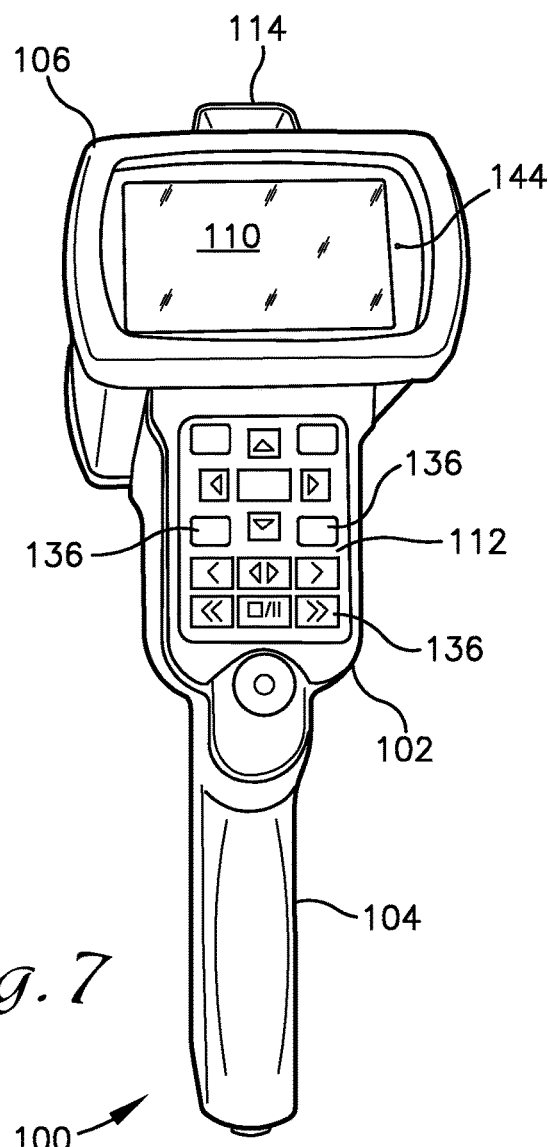

US 10,984,253 B2

TRAFFIC ENFORCEMENT SYSTEM WITH TIME TRACKING AND INTEGRATED VIDEO CAPTURE

CROSS-REFERENCE TO RELATED APPLICATION

This application claims the benefit of application Ser. No. 61/831,971, filed on Jun. 6, 2013, entitled LASER RANGING AND SPEED DETECTION WITH INTEGRATED VIDEO CAPTURE, the disclosure of which is hereby incorporated herein in its entirety by reference.

FIELD

The present invention relates unit to traffic enforcement systems for law enforcement and related applications and, more particularly, to traffic enforcement systems in which practicing target tracking history and/or periodic certification is suggested or required.

BACKGROUND

The use of radar and lasers to determine the speed of travel of objects, such as motor vehicles has been employed for quite some time. Law enforcement officials often use handheld or vehicle mounted traffic enforcement systems (TES) that emit and receive such types of radiation to identify motor vehicles that are being operated in excess of posted speed limits and to aid enforcement of those limits.

Devices have also been developed that capture an image of a vehicle as a TES unit determines the speed thereof. These images may be combined with or have superimposed thereon, the determined speed of the vehicle as well as other information associated with the vehicle, the law enforcement official, and the TES unit, among other information. For example, U.S. Pat. No. 6,985,827 to Williams et al discloses a laser-based speed measurement system that transmits image capture signals to a digital camera and produces a digital still image that includes speed data.

The emitted electromagnetic radiation, e.g., radio waves, microwaves, or light waves, may also be employed to determine the range or distance of a targeted object from the emitter or TES unit. This range data may be employed to inform a focal distance or zoom distance of a camera associated with the TES unit. For example, U.S. Pat. No. 5,939,717 to Dunne et al. discloses a speed detection and image capture system for moving vehicles that uses a laser to determine the range to the vehicle and then focuses a video camera based on the range for capture of a still image. Similarly, U.S. Pat. No. 7,920,251 to Chung discloses a speed measurement system in which a laser rangefinder is employed to trigger capture of a still image of a vehicle when the vehicle enters a predetermined range.

Traffic enforcement system (TES) units utilizing radar and laser technologies have been in use for a number of years. It is typical for the law enforcement agencies utilizing these systems to require their officers to practice established tracking history procedures. In addition to the tracking history procedures, some agencies require the officers to track the target speed for a set minimum time before taking any enforcement action. Knowing the minimum tracking time period and ensuring that the minimum tracking time was observed is the responsibility of the law enforcement officer operating the TES unit.

It is also typical for the law enforcement agencies utilizing these systems to require periodic testing and certifications as to the accuracy of the devices. The initial certification of the devices is typically performed by the system manufacturer prior to shipping to the end law enforcement agency. The periodic recertification testing is the responsibility of the law enforcement agency intending to use the equipment. The testing laboratories perform what is known as critical-performance testing (CPT) on these systems and provides the agency with the Certificates of Calibration. These certificates can be used in court to help establish the legal justification for issuing a particular traffic citation. Certification periods may vary from one jurisdiction to another and it is the responsibility of the law enforcement agency to track when each device is due for recertification.

It would be advantageous in the design of the TES devices to allow for a method of warning the operator when the date for recertification is near. This warning, for example, could be accomplished by displaying the recertification date on the device during TES device power up sequence.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter. In brief, this disclosure describes, among other things, methods, systems, and apparatus for capturing a video image and detecting a rate of travel of a moving vehicle.

An electromagnetic signal may be used to determine a distance to a moving target vehicle. A video camera employs the distance measurement to focus and/or zoom a field of view of the camera on the target vehicle such that the target vehicle substantially fills the field of view of the video camera. The distance is continuously or periodically updated and is used to adjust the zoom and/or focus of the video camera to maintain target vehicle in the field of view of the camera of a predetermined range of distances. The speed or rate of travel of the target vehicle is determined continuously, periodically, or at a desired point in time or distance using the laser and the measured speed is displayed on or in association with the video image. Accordingly, a video image depicting the target vehicle in a readily visible manner along with the speed of travel thereof is captured and may be stored or transmitted to another device.

A target range of distances within which to capture the video image and speed may be designated. In one embodiment, the target range is identified by determining a distance to a pair of landmarks to indicate the range between the landmarks as the target range. In another embodiment, a geographic positioning system (GPS) and compass heading are useable to designate the target range and may be used to identify a posted legal speed limit associated with the target range location.

In one embodiment of the invention, an apparatus is provided in the form of a handheld or vehicle mountable TES unit. The TES unit includes an inclinometer that is useable to sense a non-use orientation of the TES unit, e.g., an orientation of the TES unit when laid down on a surface. A control module in the TES unit may thus initiate a power conservation mode when the non-use orientation is sensed. The TES unit may also include a touch sensitive display and/or other control surfaces that may receive gesture commands. The one gesture command may be used to cause transmission of a frame of the video image to a printing device for printing thereof. Other gesture commands may be used to control viewing of select images or video captures.

It would be advantageous in the design of the TES unit to allow for a method of alerting the operator when the current target has been tracked for the required minimum tracking time period. This alert, for example, may be accomplished by presenting a symbol or icon on the display of the TES unit when the minimum tracking time period has been met. Another example of the alert may be to sound a beep or tone from the speaker or piezo of the TES unit when the minimum tracking time period has been met.

In an embodiment of the present invention, the aforesaid may be addressed by providing a method for entering the current time and date into the TES device at the time of certification or recertification. The method may also include entry of a date that the certification date expires at the time of certification or recertification. In addition the method may include setting a warning period before the expiration date for providing a warning or reminder to the TES device operator. The method may also disable the TES if the certification expires.

In another aspect of the invention, the TES device may include the hardware circuitry of a real time clock (RTC), GPS circuitry, or some other method of tracking the current time and date. These additional time-keeping circuits may allow the TES device to alert the operator as to the date recertification is required, the number of days remaining before certification expires, or that certification has already expired.

An additional aspect of including the time-keeping circuitry may allow the operator to set the local time and date into the traffic safety device. Allowing the operator to manipulate the time and date of the device would be optional based on the end agency requirements.

Other advantages of this invention will become apparent from the following description taken in connection with the accompanying drawings, wherein is set forth by way of illustration and example, an embodiment of the present invention.

Another improvement of the invention may be to allow the agency to choose the value of the minimum tracking time period to meet their requirements. One example of setting the agency's choice of minimum tracking time period may be to set a parameter into the TES unit by the manufacturer prior to the system shipping to the end enforcement agency. Another method of setting the minimum tracking time period may be to allow this parameter value to be entered into the TES unit in a service or maintenance mode.

Yet another improvement of the invention may be to prohibit the TES unit from locking or storing the target data if the required minimum tracking time period was not met.

DESCRIPTION OF THE DRAWINGS

Illustrative embodiments of the invention are described in detail below with reference to the attached drawing figures, and wherein:

FIG. 3 is a perspective front side view of a TES unit depicted in accordance with an embodiment of the invention;

FIG. 4 is a perspective rear view of the TES unit of FIG. 3;

FIG. 6 is a perspective front view of the TES unit of FIG. 3;

FIG. 7 is a perspective rear view of the TES unit of FIG. 3;

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include methods and systems that are substantially carried out and/or disposed in a handheld or vehicle mounted speed-detection and video-capture apparatus or Traffic Enforcement System (TES) unit 10, as depicted in FIGS. 3-7. However, it is to be understood that various components or processes of the TES unit 10 might be disposed or carried out remotely from the TES unit 10. Or the TES unit 10 might be embodied in a different form, such as, for example and not limitation, components of the TES unit 10 might be integrated into a vehicle. All such configurations are within the scope of embodiments of the invention described herein.

Figure 1:
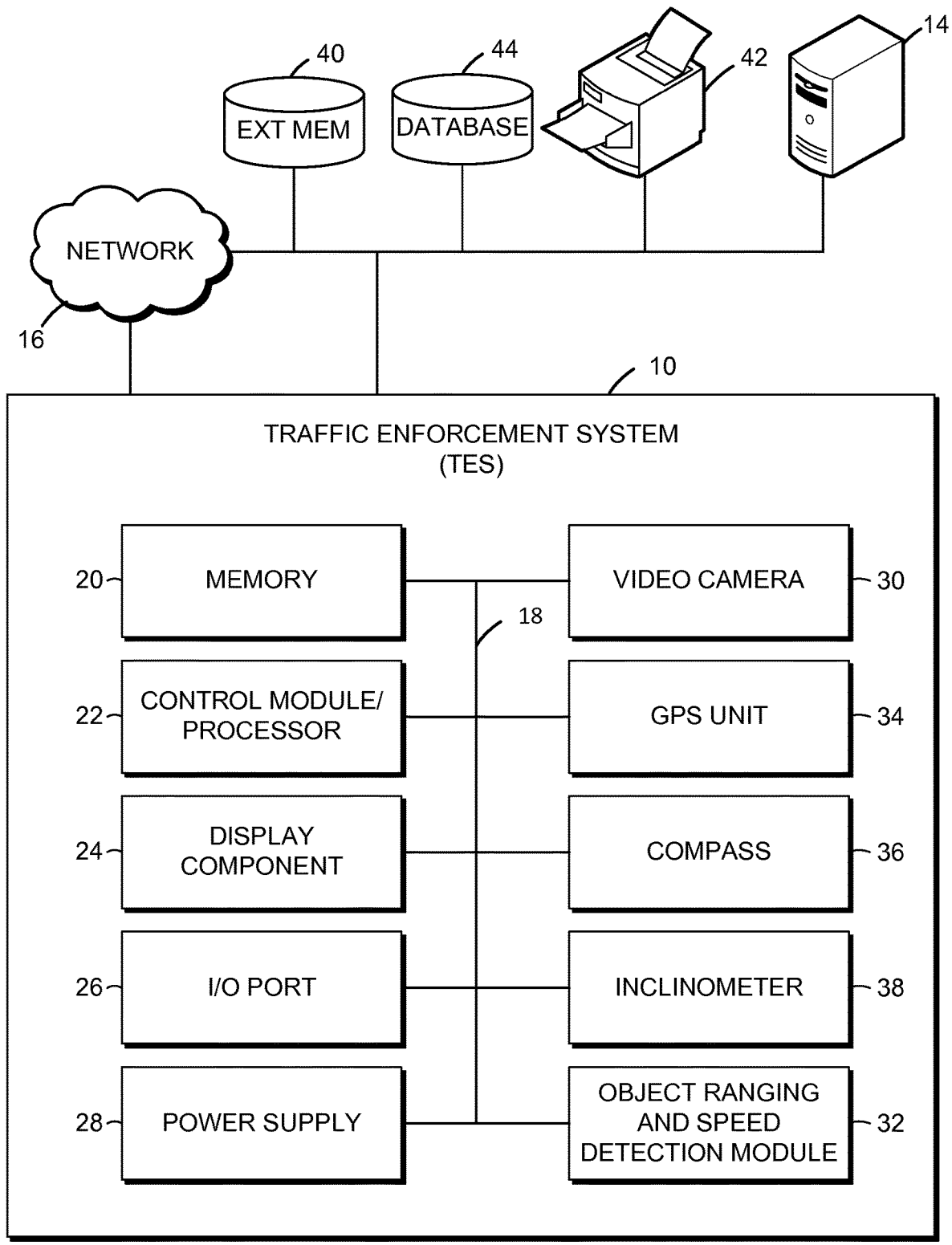
FIG. 1 is a block diagram of a traffic enforcement system (TES) unit and associated components depicted in accordance with an embodiment of the invention.
Figure 2:
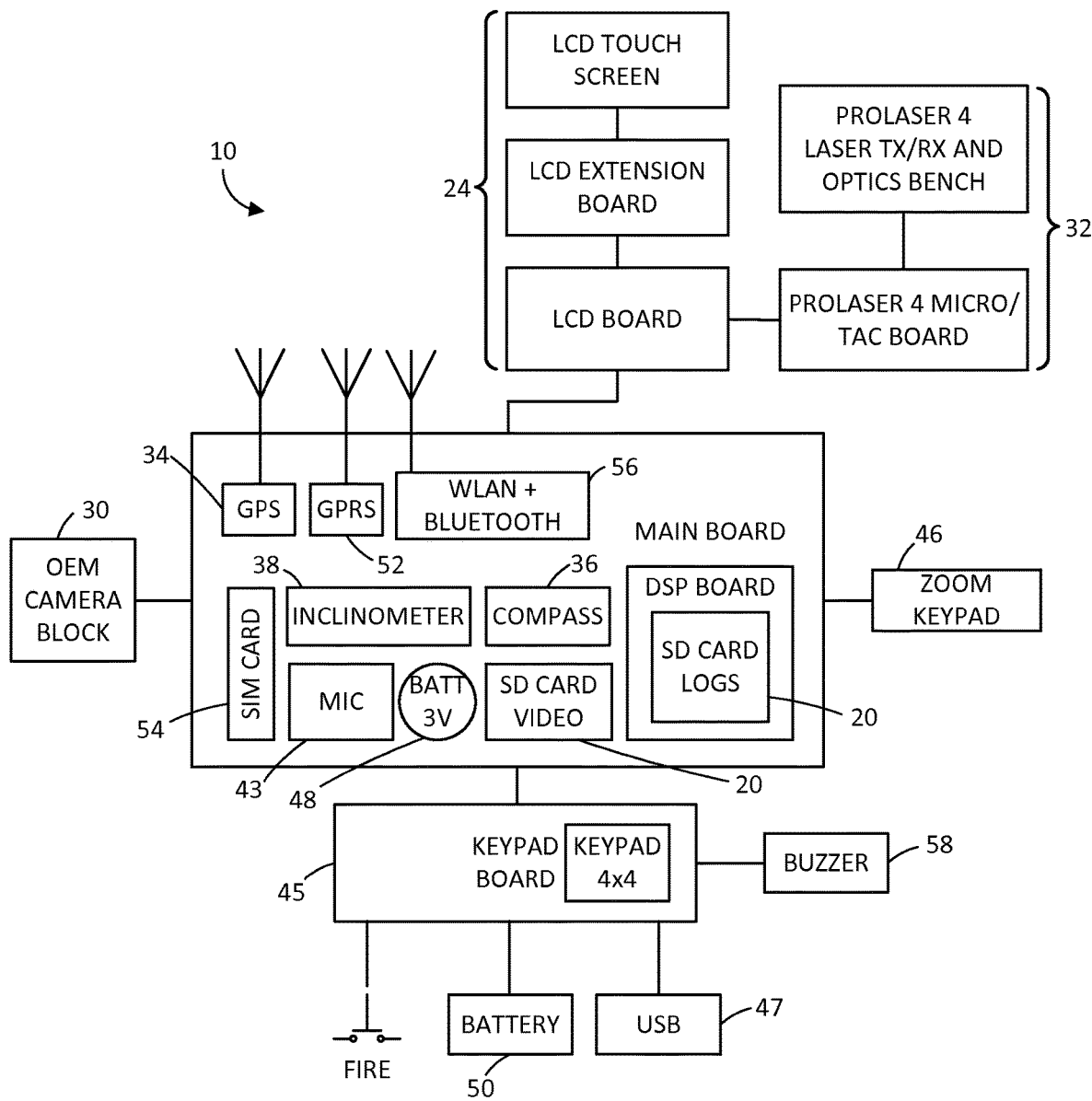
FIG. 2 is a schematic block diagram illustrating hardware components of a TES unit depicted in accordance with an embodiment of the invention.
Figure 5:
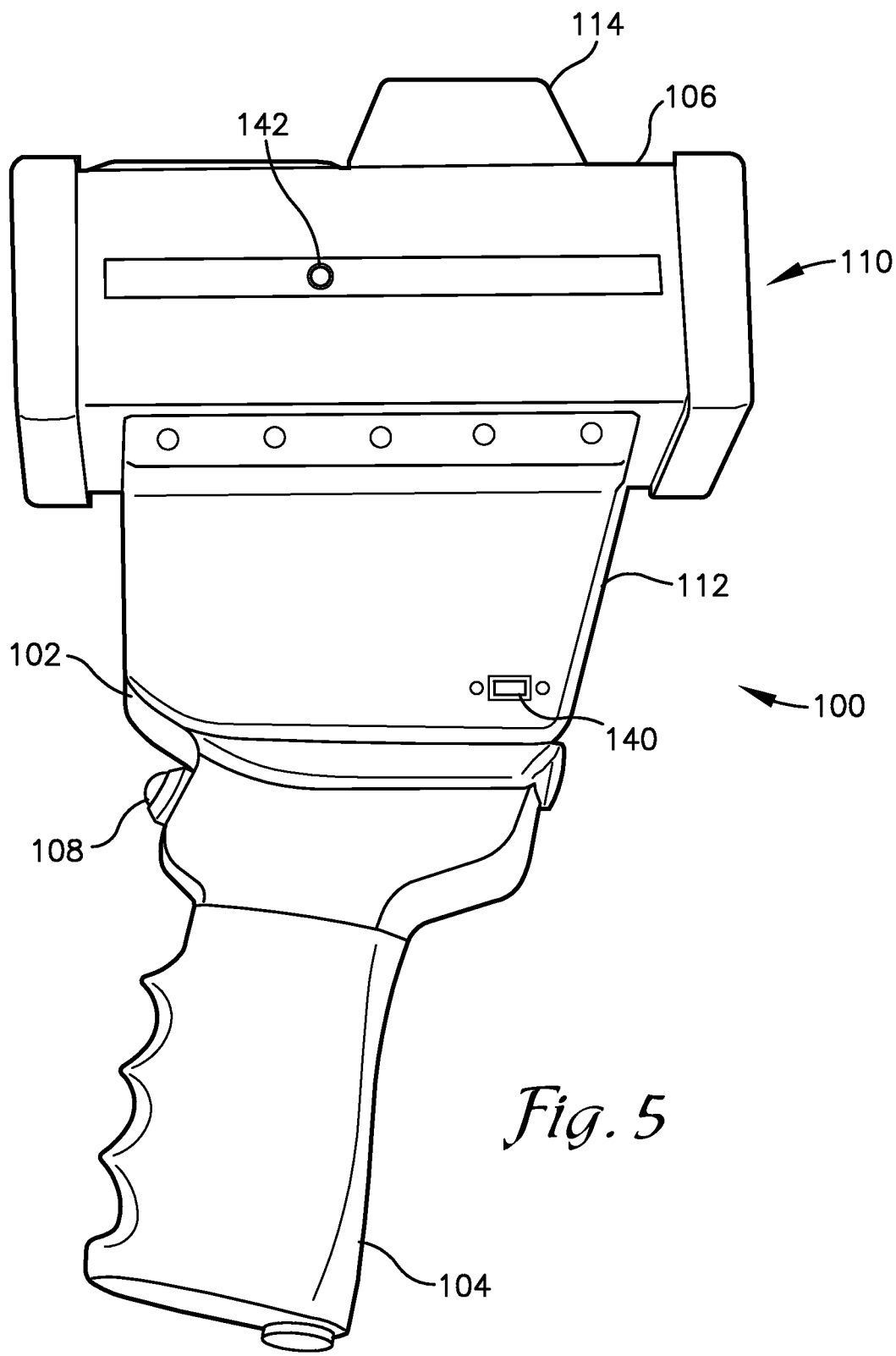
FIG. 5 is a perspective side view of the TES unit of FIG. 3.

Referring initially to FIGS. 1 and 2, exemplary block diagrams of the TES unit 10 and exemplary peripheral components are shown. The TES unit 10 is but one example of a suitable speed-detection and video-capture apparatus and is not intended to suggest any limitation as to the scope of use or functionality of embodiments of the invention.

Embodiments of the invention may be described in the general context of computer code or machine-useable instructions, including computer-executable instructions such as program modules, being executed by a control module comprising a computer, processor, or other machine. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices 14 that are linked directly or through a communications network 16 using wireless or wired connections.

With continued reference to FIGS. 1 and 2, the TES unit 10 includes one or more buses 18 that directly or indirectly couple a memory 20, a control module 22 including one or more processors, one or more display components 24, one or more input/output ports 26, an illustrative power supply 28, a video camera 30, and an object-ranging and speed-detection module 32. The TES unit 10 may also include a geographic positioning system (GPS) unit 34, a compass 36, and an inclinometer 38, among other components. The bus 18 represents what may be one or more busses (such as an address bus, data bus, or combination thereof).

The memory 20 of the TES unit 10 typically includes a variety of computer-readable media integrated with the TES unit 10 or as remotely accessible external memory 40. Computer-readable media include computer-storage media and computer-storage devices and are mutually exclusive of communication media, e.g., carrier waves, signals, and the like. By way of example, and not limitation, computer-readable media may comprise random access memory (RAM); read-only memory (ROM); electronically erasable programmable read-only memory (EEPROM); flash memory or other memory technologies; compact disc read-only memory (CDROM), digital versatile disks (DVD) or other optical or holographic media; magnetic cassettes unit, magnetic tape, magnetic disk storage or other magnetic storage devices, cloud based storage or remote memory accessible via wired or wireless connections or any other medium that may be used to encode desired information and be accessed by the control module 22 of the TES unit 10. For example, as depicted in FIG. 2, the memory 20 can comprise one or more secure digital (SD) cards.

The memory 20 and the external memory 40 include computer-storage media in the form of volatile and/or non-volatile memory. The memories 20, 40 may be removable, non-removable, or a combination thereof. Exemplary hardware devices include solid-state memory, hard drives, optical-disc drives, flash drives, cloud storage, etc.

The control module 22 includes one or more processors that read data from various entities such as the memories 20, 40 or I/O components, like the video camera 30 or GPS unit 34 and carries out processes as directed received inputs or by code stored in the memories 20, 40.

The display components 24 present data indications to a user or other device. The display components 24 may include a video display screen that presents a video image captured by the video camera 30 to a user, as described more fully below. The video display screen may be configured as a touch interface to receive inputs from the user. A head-up-display may also be provided to present a variety of data to a user and to aid the user in aiming the TES unit 10 at a desired target.

The I/O ports 26 allow the TES unit 10 to be logically coupled to other devices or components, some of which may be built in. Illustrative components include a printer 42, microphone 43, a keyboard 45, keypads 46, a buzzer 58, speaker or other audio component, a wireless device, a phone, a tablet, a personal computer, or other computing devices, etc. In an embodiment, at least one I/O port 26 comprises a universal serial bus (USB) port 47 or micro-USB port.

The power supply 28 is any source of electrical power sufficient to operate the TES unit 10. The power supply 28 may comprise an integrated battery 48 and/or removable rechargeable battery 50, as depicted in FIG. 2. The TES unit 10 might also be connected to the electrical system of a vehicle in which the TES unit 10 is disposed or associated with.

The video camera 30 comprises a video camera technology available in the art now or later developed that is configured to capture a video image of a moving target object such as a vehicle. As used herein, a video image comprises a plurality of still frames or images or portions thereof that are displayed successively to provide the appearance of a moving image as is known in the art. The camera 30 may include capabilities to autofocus on the target object and to zoom in/out, e.g., magnify an image of the target object. Zooming functions may be carried out optically or via software algorithms, e.g., digitally. In an embodiment, the video camera 30 captures a high definition (HD) video image, e.g., a video image having greater than 480 horizontal scan lines. The video camera 30 and/or the control module 22 may also be configured to select and store an indication of a single or multiple frames from the video image as still images.

The object ranging and speed-detection module 32 employs one or more of radar and laser technologies to emit an electromagnetic signal directed toward a target object and receiving at least a portion of the signal that is reflected by the target object. In an embodiment, the object ranging and speed-detection module 32 is a light detection and ranging (LIDAR) unit. The object ranging and speed-detection module 32 may determine the distance to the target object based on the time between emitting and receiving the signal and may calculate the speed of travel of the vehicle based on differences in the distance measurements over time. The ranging and speed detection processes employed by the module 32 use known methods and are thus not described in detail herein.

The TES unit 10 may include the GPS unit 34, compass 36, and inclinometer 38 to provide location and state information of the TES unit 10. The GPS unit 34 is configured to provide a geographic location of the TES unit 10 and compass 36 is useable to provide the direction or heading at which the object ranging and speed detection module 32 is directed to emit laser or radar signals. A GPS database 44 may be included in the GPS unit 34 or accessible remotely to provide geographic information associated with the geographic location determined by the GPS unit 34. For example, the GPS database 44 may include locations of roadways and legal speed limits therefor, among other data. The inclinometer 38 measures a degree of tilt of the TES unit 10 away from vertical in one or more directions, e.g., the inclinometer 38 may detect when the TES unit 10 is laid down on a surface or is pointed toward the ground.

In some embodiments, the TES unit 10 includes cellular or wireless communication module 52, such as a general packet radio service (GPRS) module or another wireless communications system. A subscriber identity module or SIM card 54 can also be provided to enable access to wireless networks by conventional methods. The communication module 52 enables wireless communication of voice or data from the TES unit 10 to disparate systems using available cellular networks. The TES unit 10 may also include a wireless local area network (WLAN) and/or BLUETOOTH communications modules 56 to enable short range communications with other devices or networks.

With additional reference now to FIGS. 3-7, a TES unit 100 is described in accordance with an embodiment of the invention. The TES unit 100 is described with respect to a particular embodiment, however such is not intended to limit embodiments of the TES unit 100 to any particular configuration. The TES unit 100 includes a body 102 having a handle portion 104 and an upper housing 106. The handle portion 104 is configured similar to a pistol grip to provide a natural and comfortable grip for a user while operating the TES unit 10. A trigger 108 is provided near an upper end of the handle portion 104 that is operable by a user's finger to initiate target vehicle ranging and speed-detection processes as described more fully below.

A rear display 110, a main keyboard 112, a head-up-display (HUD) 114, a transmitter lens 116, a receiver lens 118, and a video camera 120 are disposed in the upper housing 106. The rear display 110 is configured to present a video image captured by the video camera 120 and/or from a stored memory file. In an embodiment, the rear display 110 is touch sensitive and may receive touch inputs from a user. The touch inputs may comprise any form of touch input, such as a tap or click on a displayed icon, a click-and-drag, a swipe, or any other gesture input.

Figure 8:
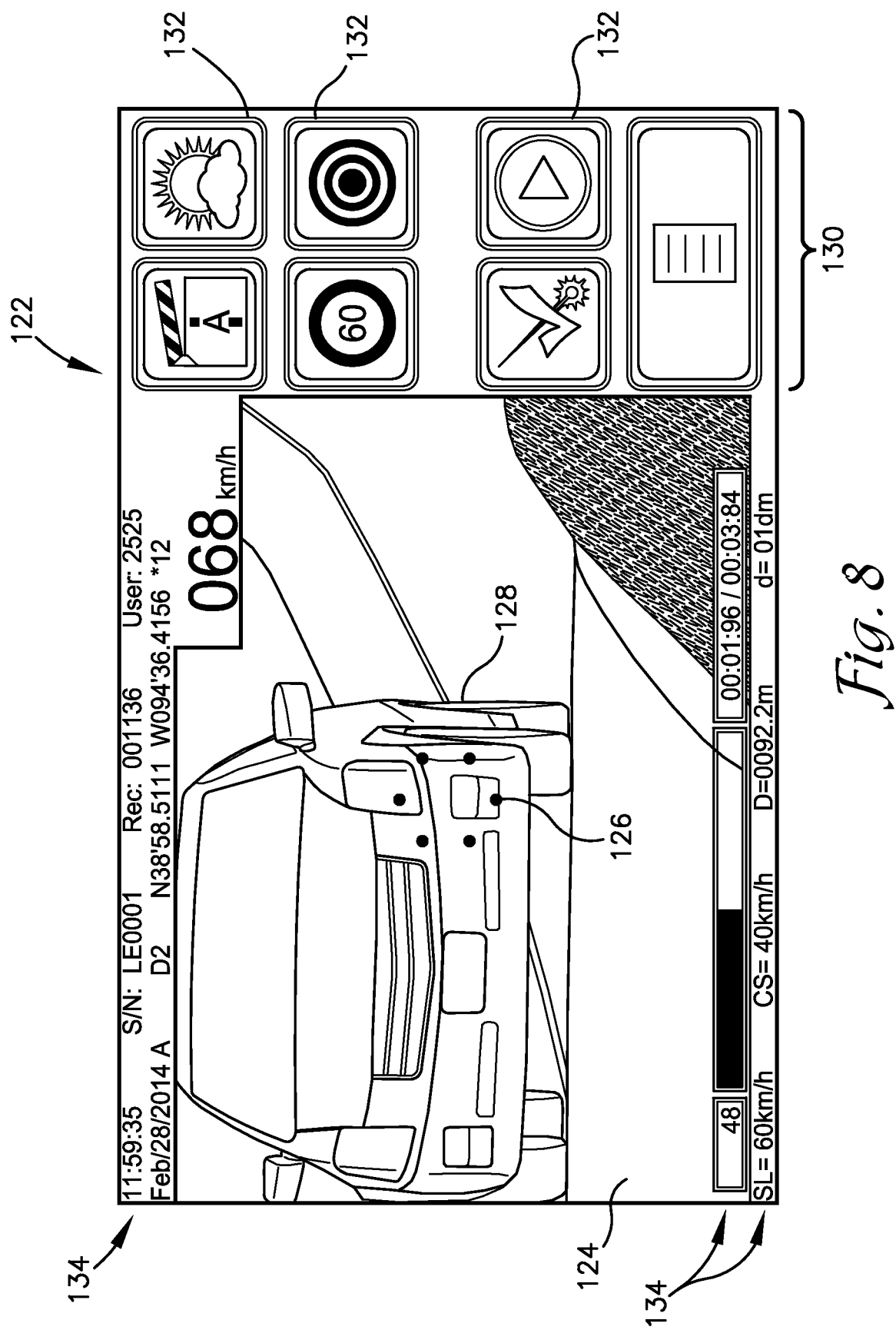
FIG. 8 is an illustration of an exemplary display that may be presented on a rear display of a TES unit in accordance with an embodiment of the invention.

An exemplary display image 122 provided by the rear display 110 is depicted in FIG. 8. The display image 122 includes a video display window 124 in which a video image may be displayed. The window 124 may include a crosshairs, aiming reticle 126, or other aiming indicia is superimposed thereon to aid a user in aiming the TES unit 100 at a desired target 128. A control area 130 is provided in the image 122 and includes a plurality of icons 132 that may be selected to provide commands, settings, or the like. A variety of data display regions 134 may also be provided in which data such as time, date, serial number of the TES unit 10, record number, GPS coordinates, number of GPS satellites detected, user identification, operation mode, camera settings, range to target, speed of target, speed limit, laser diameter at target, battery life, or the like may be presented.

The main keyboard 112 is disposed adjacent to the rear display 110 and provides a plurality of buttons 136 or other control surfaces that are useable to provide commands, selections, or the like. In an embodiment, one or more of the buttons 136 are redundant with respect to those of the control area 130 in the rear display 110. One or more additional keyboards or control surfaces may be provided on surfaces of the TES unit 110, like a zoom control panel 138, to provide quick or direct access to one or more control functions.

The HUD 114 is located on an upper surface of the upper housing 106 and includes a transparent or translucent lens through which a user may view a target to aim the TES unit 110 thereat. An aiming reticle may be displayed or projected onto the lens along with the speed and/or range of the target, among other information.

The transmitter lens 116 and receiver lens 118 are located on a front surface of the upper housing 106 opposite the rear display 110. The transmitter lens 116 and receiver lens 118 form parts of an object ranging and speed-detection system of the TES unit 100, like for example the object ranging and speed-detection module 32 of the TES unit 10. As known in the art, the transmitter lens 116 directs an emitted laser or light beam in a desired direction while the receiver lens 118 receives at least a portion of the emitted light that is reflected back off of a target. In an embodiment, the TES unit 100 also employs radar technology for one or more of object detection, vectoring, ranging, Doppler, across the road radar, and/or speed detection. Such embodiments include radar transmitters, receivers, and/or transceivers configured to carry out such processes, as well as video analytics or other speed sensors.

The video camera 120 is also disposed in the upper housing 106 and is directed generally parallel to the transmitter and receiver lenses 116, 118 to capture a video image of a target at which the TES unit 100 is aimed. The video camera 120 includes optical and/or digital zoom capability that may be adjusted to provide a video image of the target in which the target encompasses a majority of a field of view of the video image and/or identifying features of the target, e.g., a license plate number, are discernable. The video camera 120 may also include autofocus features that automatically adjust a focal plane of the video camera 120 to focus on the target with respect to a distance thereto and a level of zoom or magnification thereof. The video camera 120 may also be operated in manual focus mode.

The TES unit 100 may include an input/output port 140, such as a mini-B USB port, disposed on a surface thereof. The I/O port 140 may enable coupling of the TES unit 100 to a computing system, printer, battery charger, or the like to provide data communication or charging of the battery. A mounting hole 142 may also be provided for mounting of the TES unit 100 on a tripod, in a vehicle, or the like.

As depicted in FIG. 7, a microphone 144 may be provided adjacent the rear display 110 or at another location on the TES unit 10. The microphone 144 may enable use of voice commands for operation of the TES unit 10, recording of audio data, such as notes from a user or a conversation between the user and a motorists being ticketed for speeding, among other audio data.

Figure 9:
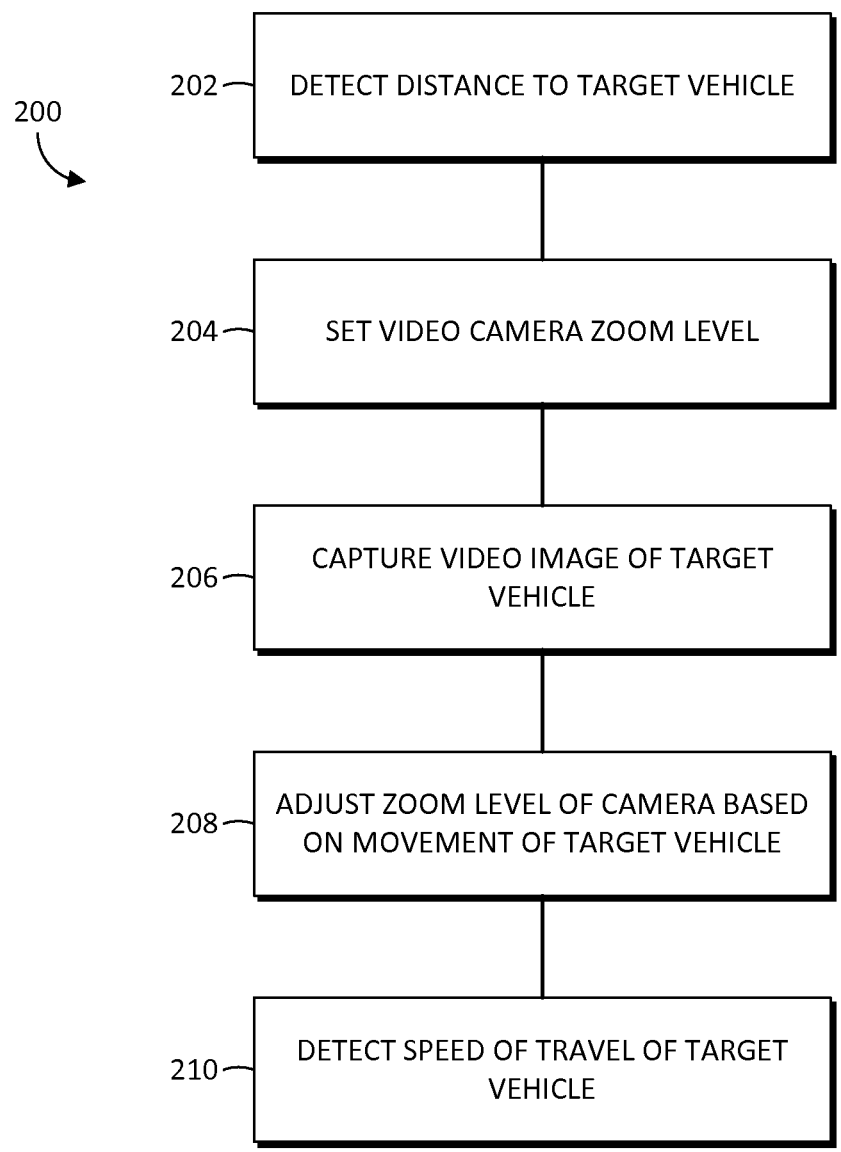
FIG. 9 is a flow diagram of a method for capturing video of a vehicle during detecting of the speed of travel thereof depicted in accordance with an embodiment of the invention.

With reference to FIG. 9, a method 200 for capturing video of a vehicle during detecting of the speed of travel thereof is described in accordance with an embodiment of the invention. A law enforcement official or other user typically sets up at a location near or alongside a roadway on which potential target vehicles travel. The TES unit 100 is aimed at a target vehicle using one or both of the HUD 114 and the rear display 110 by placing the vehicle within the respective field of view or by locating an aiming reticle 126 or crosshairs on the target vehicle 128 as depicted in FIG. 8. When the rear display 110 is used, the video camera 120 is first activated and focused manually or automatically on the target vehicle 128.

The distance to the target vehicle is detected using the object ranging and speed-detection systems, e.g., a LIDAR system, of the TES unit 100 as indicated at step 202. In an embodiment, the trigger 108 is depressed to initiate the detection of the distance to the target.

The zoom level or magnification of the video camera 120 is set based on the distance to the target detected by the object ranging and speed-detection system. The zoom level is set with respect to the distance to the target vehicle such that the target vehicle occupies a majority of the field of view of the video image captured by the video camera 120. In an embodiment, the target vehicle substantially fills the field of view, e.g., the surfaces of the vehicle lie in close proximity to the borders of the field of view of the video image. In another embodiment, the zoom level is set such that an identifying characteristic of the target vehicle like a make, model, color, or the like as well as an identifying marking, such as a license number or license plate, on the target vehicle are discernable in the video image. The zoom level may also be set to allow capture of at least a portion of the vehicle's surroundings in the video image. For example, as depicted in FIG. 9, the zoom level of the display image is sufficiently set to enable identification of a make, model, and color of the vehicle as well as viewing of a the license plate number on the target vehicle 128. The location of the target vehicle might also be identifiable based on the vehicle's surroundings captured in the video image.

The intensity of zooming may be tailored to provide a desired size of the target vehicle in the video image, e.g., the zoom intensity may be tailored to substantially fill the field of view of the video image or to fill a lesser portion of the field of view and to provide a display a greater amount of the surroundings of the vehicle. In one embodiment, the zoom intensity is tailored or adjusted using the zoom control panel 138 on the TES unit 100 or a redundant control provided on the rear display 110 or main keyboard 112.

As depicted at step 206, a video image of the target vehicle is captured using the video camera 120. The video image may be displayed on the rear display 110 in real-time and/or stored in a memory, such as the memory 20. The video image may also be transmitted wirelessly or through a hard connection to an external memory location, like the external memory 40, located in a vehicle of the user or at a remote location. In an embodiment, video capture is initiated by the user depressing the trigger 108. In another embodiment, video capture is continuously active while the TES unit 100 is powered on, but storage of the video image is not initiated until receipt of a command to do so from the user, such as by depressing the trigger 108. The video might also be stored in a memory buffer for a predetermined duration and then committed to a storage memory when the trigger 108 is depressed. Such a buffer may allow capture of the video image of the target vehicle for a period prior to depression of the trigger 108 by the user and after the trigger is released and may account for a delayed reaction of the user and provide additional context for the recording of the desired event.

The zoom level of the video camera 120 is one of continuously, periodically, or intermittently adjusted based on movement of the target vehicle as detected by distance measurements performed by the object ranging and speed-detection systems as depicted in step 208. The TES unit 100 detects the distance to the target vehicle continuously, periodically, or intermittently. One or more of these distance measurements are thus usable by the TES unit 100, or more specifically the video camera 120, to adjust the zoom level thereof to generally maintain the appearance of the target vehicle in the video image, e.g., the ratio of the size of the target vehicle with respect to the field of view of the video image is generally maintained. The distance measurements may also be used to adjust the focus of the video camera 120 or the camera's internal focus mechanisms may be employed.

At step 210 the speed of travel of the target vehicle is detected. The speed is detected by methods known in the art including comparison of distance measurements over a period of time to determine a distance traveled by the target vehicle over that period of time and thus the rate of travel of the target vehicle. The speed of the target vehicle may be continuously, periodically, or intermittently, detected during use of the TES unit 100 or may only be detected upon depression of the trigger 108. An indication of the speed of the target vehicle may be displayed on or in association with the video image on the rear display 110 and/or on the HUD 114. An indication of the speed of the target vehicle as well as any other data associated with the TES unit 100 may also be stored with the video image, such as in metadata associated with the video image.

Figure 10:
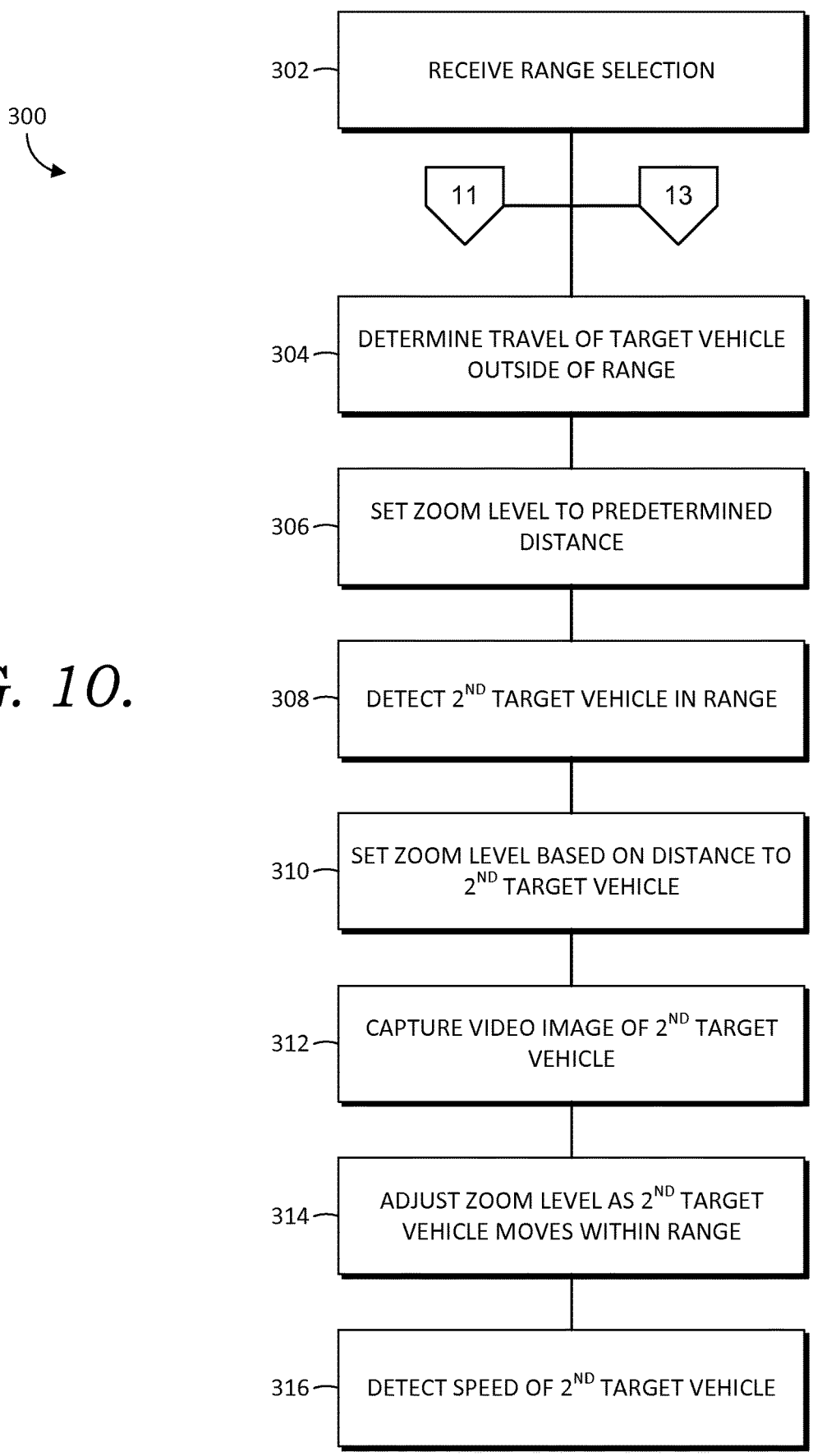
FIG. 10 is a flow diagram of another method for capturing video of a vehicle during detecting of the speed of travel thereof depicted in accordance with an embodiment of the invention.

A method 300 for capturing video of a vehicle during detecting of the speed of travel thereof is described in accordance with another embodiment of the invention (see FIG. 10). At a step 302 a range within which to monitor target vehicles is received. The range generally comprises a range of distances from the TES unit 100 with which to monitor target vehicles and may be provided in a variety of ways. For example, a user might simply provide a range of distances via the touch interface of the rear display 110 or keyboard 112.

Figure 11:
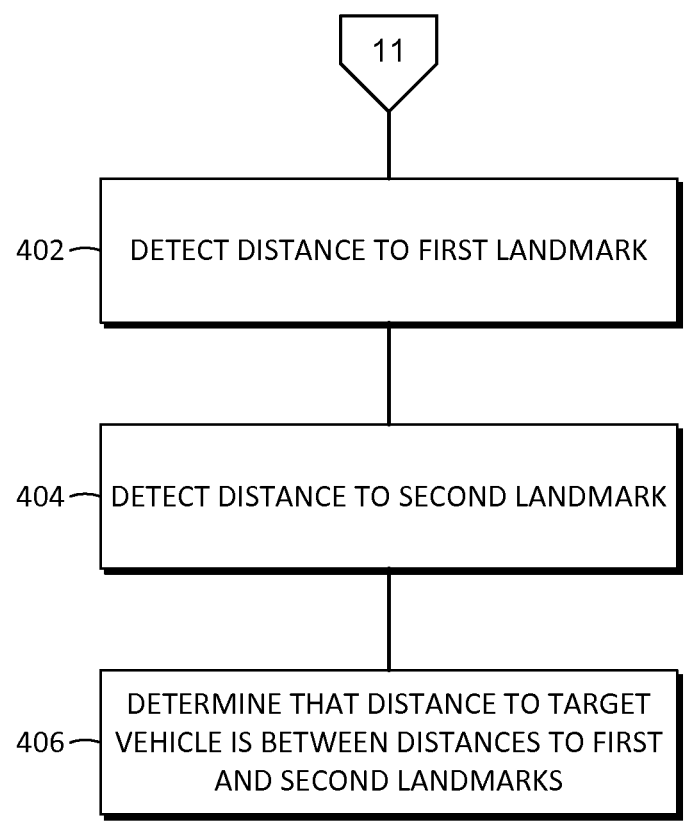
FIG. 11 is flow diagram of a method for determining a range for monitoring target vehicles depicted in accordance with an embodiment of the invention.

The range may be provided by detecting a distance to a first landmark 502, as depicted by step 402 in FIG. 11. The landmark may comprise any object, such as a road sign, fire hydrant, tree, utility pole, a vehicle, or the like. A distance to a second landmark 504 is detected at step 404. The first and second landmarks 502, 504 thus define a range 506 within which target vehicles 508 are to be monitored when it is determined that the target vehicle 508 is within the range as depicted at step 406.

Figure 13:
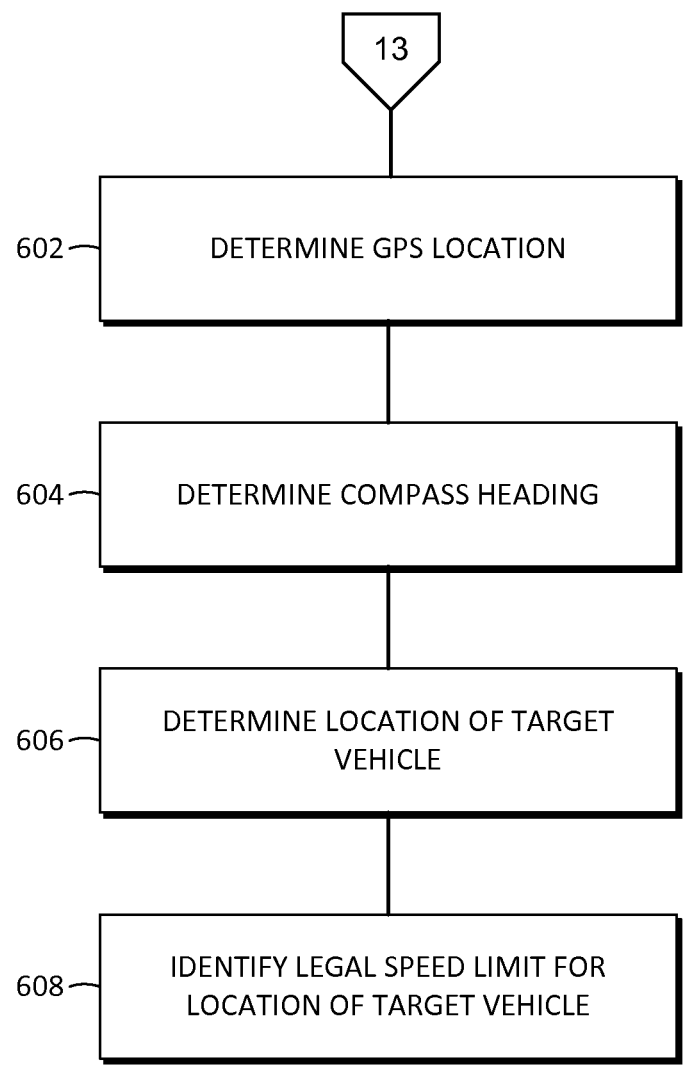
FIG. 13 is a flow diagram of a method for determining a range for monitoring target vehicles using a GPS system depicted in accordance with an embodiment.

The range might also be selected using GPS, as shown in FIG. 13. As depicted at step 602, the location of the TES unit 100 is determined using a GPS unit integrated in the TES unit 100 or associated therewith. A database of GPS information may be consulted based on the location of the TES unit 100 to identify roadways and associated speed limits thereof. A user might select a portion of a roadway using the touch interface of the rear display 110 and/or keyboard 112. Or locations of a pair of landmarks might be determined based on the location of the TES unit 100, a distance to the landmarks, and a compass heading of the TES unit 100 when aimed at each of the landmarks. These locations may then be employed in association with the GPS information to identify a portion of a roadway within which to monitor target vehicles.

A compass heading of the TES unit 100 when aimed at a target vehicle is determined at a step 604. The location of the target vehicle is determined base on the location of the TES unit 100, the distance of the target vehicle form the TES unit 100, and the compass heading therebetween as depicted in step 606. A legal speed limit for the roadway at the location of the target vehicle may be identified from the GPS data at step 608.

Figure 12:
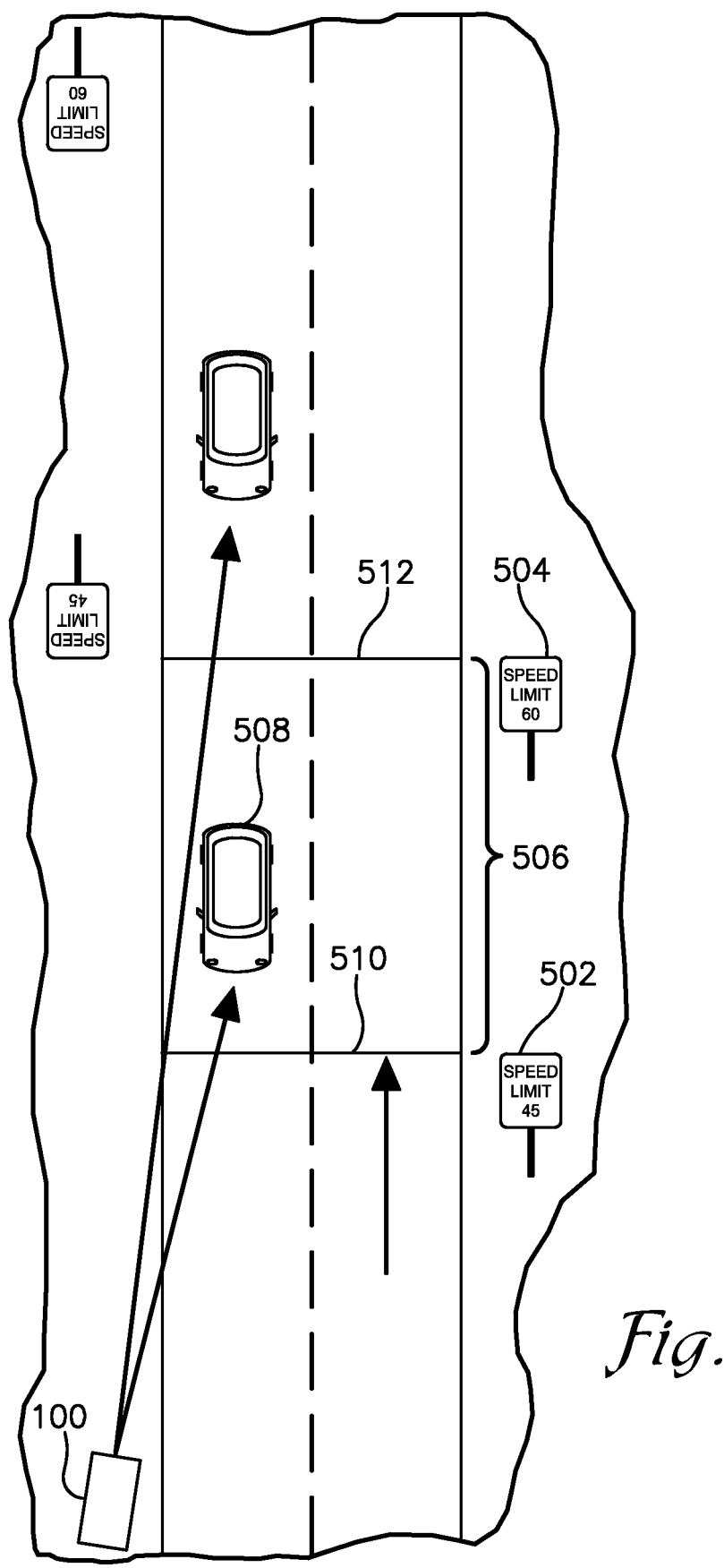
FIG. 12 is an illustration of target vehicles traveling through a monitoring range depicted in accordance with an embodiment of the invention.

Returning to FIG. 10, after receiving selection of the range by any of the above methods, a target vehicle is monitored and is determined to have traveled outside of the range as depicted at step 304. The zoom level of the video camera 120 is set to a predetermined level as indicated at step 306. The predetermined zoom level comprises any desired zoom level and may be a zoom level associated with target vehicles at a closest or furthest distance of the range (such as a closest distance 510 or furthest distance 512 of the range 508 depicted in FIG. 12) or may be a minimum or maximum zoom of the video camera 120, among others.

The predetermined zoom level may be selected to enable quick and/or easy zooming or focusing of the video camera 120 on a target vehicle entering a closest or furthest boundary of the range. For instance, when monitoring vehicles traveling toward the TES unit 100, the predetermined zoom level may be a zoom level associated with capturing video images of target vehicles at the furthest distance of the range. As such, the video camera 120 may be preset to a desired zoom level to immediately capture a desired video image of a target vehicle when it enters the range without requiring adjustment of the zoom level. Thus, upon travel of a target vehicle outside of the range, the zoom level may be adjusted to the predetermined zoom level in preparation for monitoring a next vehicle to enter the range.

At step 308 a second target vehicle is detected as having entered the range. The zoom level of the video camera 120 is adjusted from the predetermined zoom level based on the distance to the second target vehicle, if necessary, as depicted at step 310. A video image of the second target vehicle is captured, such as in response to depression of the trigger 108 by the user, at step 312. The zoom level is adjusted to maintain the desired video image of the second target vehicle based on changing distances thereto as the second vehicle moves within the range at step 314. The speed of the second target vehicle is detected as indicated at step 316. The speed of the second target vehicle may be detected continuously, periodically, intermittently, or singly as the second target vehicle is monitored.

In one embodiment, the capture of the video image is initiated by detection of a speed of a target vehicle that exceeds a legal limit as defined by data associated with a geographic location of the target vehicle or as provided by a user of the TES unit 100. In such an embodiment, the vehicle might also be required to be within the set range prior to initiation capturing the video image. The detection of the speed of the target vehicle may thus precede the capturing of the video image.

Accordingly, a video image of a target vehicle may be captured throughout all or a portion of a range and the speed of the target vehicle may be simultaneously captured and displayed in association with the video image. The zoom level of the video camera 120 is adjusted during capture of the video image based on the distance measurements of the TES unit 100 so as to track movement of the target vehicle and to enable positive identification of the target vehicle in the video image. The displayed detected speed may be updated continuously, periodically, or intermittently throughout the video image so as to depict the speed of the target vehicle at a plurality of points in the video image and the range. The TES unit 100 thus provides substantial evidence of behaviors of target vehicles, or more correctly, motorists driving the target vehicles, that may be used as proof of infractions committed by such motorists.

In one embodiment, the TES unit 100 is in communication with a printer, such as the printer 42, via a wireless or hard connection. A user may thus provide an input to the TES unit 100, like, for example, a swipe or other gesture on the touch interface of the rear display 110 to cause a frame of the video image to be printed on the printer. The printed image may include one or more data elements associated with the monitoring of the target vehicle, such as the detected speed thereof. Such a printer may be installed in a user's vehicle. The printed image may thus be provided to a motorist that has been stopped by the user as proof of the motorist's commission of an infraction.

In one embodiment, monitoring history of the TES unit 100 and data associated therewith may be recorded. The recorded data may be correlated with associated GPS data to display indications of the monitoring history on a map. For example, target vehicle speeds monitored by the TES unit 100 or a plurality of TES units 100 might be plotted on a map to depict roadways that show a propensity for speed infractions or to depict average monitored speeds on those roadways, among a variety of other possible data displays.

Figure 14:
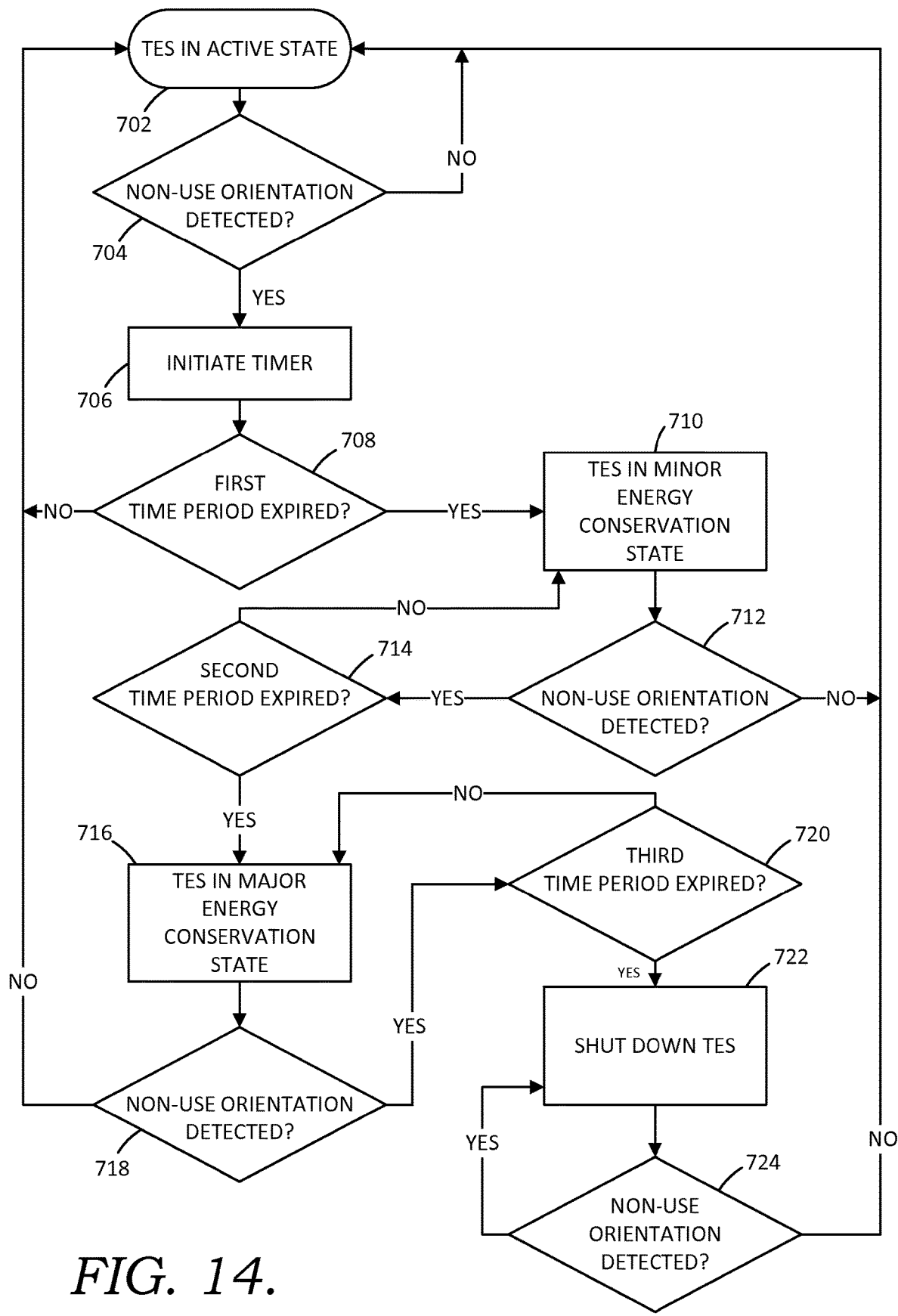
FIG. 14 is a flow diagram of an energy conservation process useable by a TES unit and depicted in accordance with an embodiment of the invention.

The TES unit 100 may also include an inclinometer that is configured to measure an angle of inclination or tilt of the TES unit 100 (see FIG. 14). The angle may be used by the TES unit 100 or a control module therein to determine that the TES unit 100 is not in use or at least is not in an orientation in which a target vehicle may be monitored, e.g., the TES unit 100 has been laid down on a surface like a dash board or seat of a user's vehicle or a user is holding the TES unit 100 down at their side. An angle indicative of such a non-use orientation might be an angle of greater than about 90° from vertical, or more preferably greater than about 70° from vertical, however any desired angle may be employed.

Initially, the TES unit 100 is in an active state in which normal operation for monitoring target vehicles may be completed as indicated by block 702. When a non-use orientation of the TES unit 100 is indicated by the inclinometer (block 704), the control module of the TES unit 100 initiates a timer or counter as depicted by block 706. Upon expiration of a first period of time (block 708), such as about five seconds, the TES unit 100 is placed in a minor energy saving state (block 710) in which components such as the rear display 110, the HUD 114, and the GPS unit, among others are powered down or turned off.

When the TES unit 100 remains in a non-use orientation (block 712) for a second period of time (block 714), such as about two minutes, the TES unit 100 is placed in a major energy conservation state as indicated by block 716. In the major energy conservation state, components such as the video camera 120 and the object ranging and speed-detection module 32 are powered down.

When the TES unit 100 remains in a non-use orientation (block 718) for a third period of time (block 720), such as about an additional eight minutes, all components and operations of the TES unit 100 are shut down as depicted by block 722. The inclinometer may remain continuously or periodically active in the shut down state such that when a non-use orientation is not detected, e.g., the TES unit 100 is returned to a use orientation, e.g., the TES unit 100 is again fully powered on to resume the active state. The TES unit 100 may also be returned to the active at any point in the power conservation process when a use orientation is detected.

The TES unit 100 thus may be powered down over a period of time to conserve battery power. By delaying full shut down of the TES unit 100, the TES unit 100 may be laid down momentarily and then picked up again to resume use thereof without encountering delays resulting from restarting the various components or processes of the TES unit 100 that might be encountered if the TES unit 100 were immediately fully shut down. The energy conservation process also allows the TES unit 100 to be automatically shut down when placed in a non-use orientation to avoid depleting batter power when the TES unit 100 is not in use.

Figure 15:
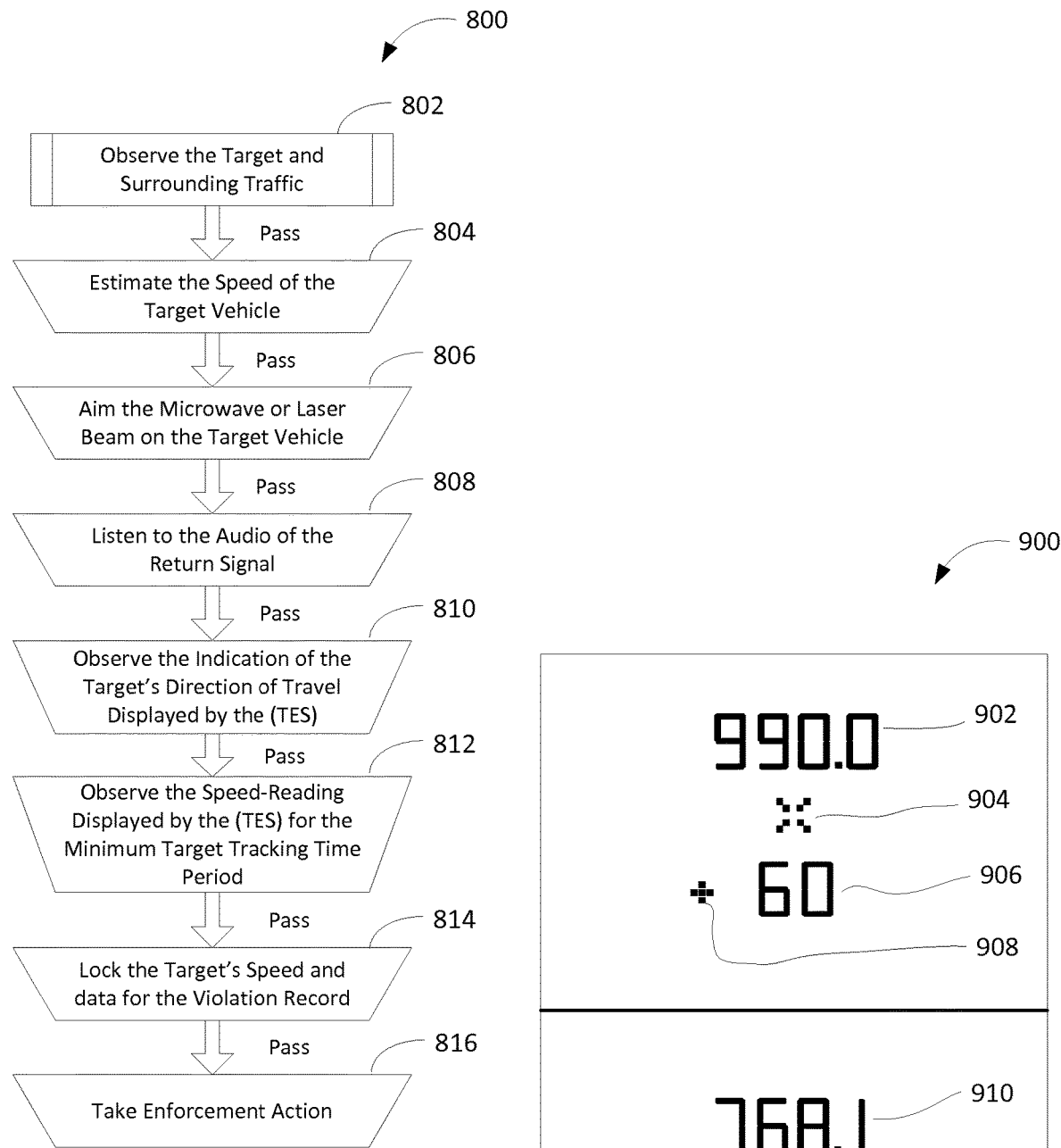
FIG. 15 is a block diagram of target tracking history process.

Turning now to FIG. 15, a block diagram of a typical Target Tracking History Process, indicated by reference numeral 800, as may be performed by an officer operating the TES unit 100 is described in accordance with an embodiment of the invention. In block 802 the officer observes the target vehicle and how that vehicle relates to the surrounding traffic. Traffic enforcement officers often receive detailed training in estimating the speed of vehicles. This type of estimate of the target vehicle is made in block 804. In block 806 the office targets the vehicle by aiming the laser beam or microwave beam from the TES unit 100 at the target vehicle. The radar system will present the Doppler return audio that is related to the speed of the target. The laser system will sound a piezo tone or other audible signal related to the quality of the laser return. The Officer will listen to this return audio during block 808. During block 810 the officer will ensure the direction of travel indicated by the TES unit 100 matches the direction of travel of the target vehicle. Block 812 is the block most concerning to the aspects of the invention. During block 812 the officer observes the speed-reading as displayed by the TES unit 100. During the period of time the officer is observing the displayed target speed the value of the speed should remain relatively stable and it should closely match his estimate from block 104. Once the officer is satisfied, the speed reading from the TES unit 100 is valid he may proceed to block 814 to lock or store the data from the target reading. This data may contain the target's speed, direction of travel, distance to the target, time, date, etc. Having the data locked or stored may be helpful if the officer determines to proceed to take enforcement action as depicted by block 816.

It may not be desirable for the officer in the field to be able to set or change the minimum tracking time period. In a preferred embodiment, the invention would provide a method for the period of the minimum tracking time to be set into the TES unit 100 at the manufacturers prior to shipping to the end law enforcement agency. During the manufacturing process the TES unit 100 may be loaded with a set of parameters. These parameters determine the operational behavior of the TES unit 100. The parameter values are determined by the individual requirements of the agency purchasing the TES unit 100. In a preferred embodiment of the invention the following parameters are included in the TES unit 100 parameter list. 1) 'HudTrackAlert'=0 or 1. If the parameter 'HudTrackAlert' is set to equal 1, the minimum target tracking option is enabled. 2) HudTimeTrak=xx. The integer value loaded in the 'HudTimeTrak' parameter sets the number of tenths of seconds required for the minimum target tracking time period. For example, an individual agency may require their officers to observe the target vehicle's speed reading for a minimum of two (2) seconds. The parameters of the TES unit 100 may be set to: HudTrackAlert=1 and HudTimeTrak=25. This would enable the Target Time Tracking feature and set the minimum target time tracking period to 2.5 seconds.

Another aspect of the preferred embodiment is that the TES unit 100 may allow the parameter values to be loaded in the service or maintenance mode. This method allows the target tracking time feature to be enabled and the minimum tracking time period to be set at the factory or at a service center.

From the example given above, an individual agency may require their officers to observe the target vehicle's speed reading for a minimum of two seconds. Previously the officer was responsible for estimating the time period that he has tracked the target, which must be for a minimum tracking time period.

Figure 16:
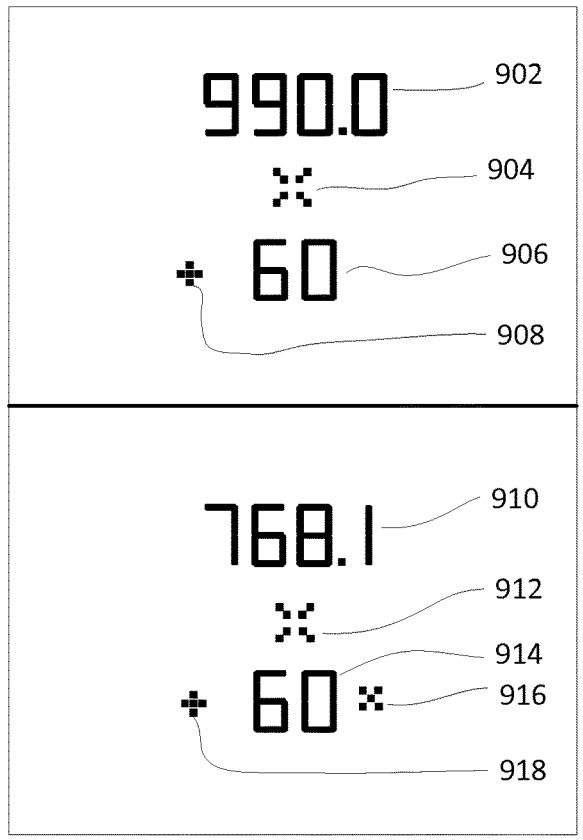
FIG. 16 is a display of a minimum target tracking time alert.

Referring to FIG. 16, exemplary displays that may be presented by the HUD 114 are depicted in an illustration 900 in accordance with embodiments of the invention to aid description of a method to alert the officer when the target had been tracked for the minimum target tracking time. The example given is for a TES unit 100 with the tracking time set to 2.5 seconds and looking through the HUD 114. The top half of the illustration depicts the HUD 114 displayed when the officer first acquires the target readings. An indicia 902 indicates the target distance is 990.0 feet from the TES unit 100. A laser aiming reticle is depicted by 904. A value indicia 906 indicates the target is traveling 60 miles-per-hour (mph). The '+' symbol 908 is to indicate the target direction of travel is approaching the TES unit 100. The lower half of illustration 900 shows the same HUD 114 after the officer has continued to track the target for 2.5 seconds. The indicia 910 now shows the distance to the target is 768.1 feet. Reference numeral 912 still depicts the Laser aiming reticle. A value indicia 916 shows the target is still traveling 60 mph and the '+' 918 shows the target is still approaching the TES unit 100. But the TES unit 100 has now displayed a symbol 916 to alert the officer the minimum target tracking time period requirement has been met.

An audible tone or beep may be sounded to alert the officer that the minimum target tracking time period requirement has been met. This method of audible alert may be used instead of the visible alert or in combination with the visible alert.

The option to not allow target data to be locked or stored if the minimum target tracking time parameter was not met may be coded in the firmware or software of the TES unit 100.

Figure 17:
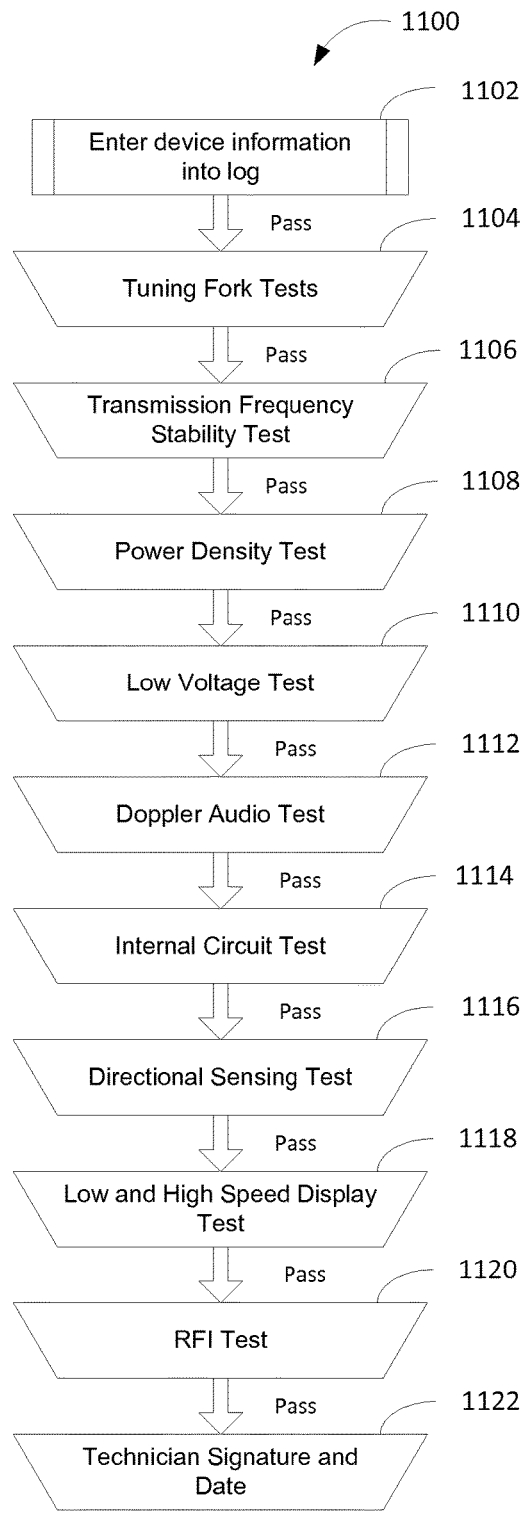
FIG. 17 is a block diagram example of a certification process.

Referring to FIG. 17, a block diagram of a certification process 1100 that may be performed at a testing laboratory for a radar or laser based TES unit is described in accordance with an embodiment of the invention. The certificate example shown in FIG. 17 is for a radar based device. Blocks 1102 through 1122 show the process steps the laboratory technician may take to complete the certification. For example, the technician first enters the device information, such as device model and serial number into a laboratory log as depicted at block 1102. The technician then performs a tuning fork test 1104, typically using two different tuning forks of different frequencies representing two different target speeds. The tuning fork test may include the steps of: 1) placing the radar in stationary mode of operation; 2) placing the range control in maximum position; 3) placing the antenna in the transmit mode by releasing the hold switch or putting the radar unit in run mode; 4) lightly striking a lower speed fork on a hard non-metallic surface and holding the tuning fork approximately one inch in front of the antenna; 5) verifying that the target speed displays the same as the speed stamped on the tuning fork+/−1 mph; 6) repeating steps 4 and 5 using the higher speed tuning fork; 7) placing the radar in a moving mode of operation; 8) using the lower speed fork, perform step 4 and verifying that the patrol speed displays the same as the speed stamped on the tuning fork+/−1 mph; 9) while continuing to hold the lower speed fork in front of the radar, perform step 4 on the higher speed fork, holding it in front of the radar as well; and 10) with both forks now vibrating simultaneously in front of the radar antenna, verifying that the PATROL speed reads the lower speed fork, and the TARGET speed reads the speed stamped on the higher fork, minus the speed on the lower fork.

If the unit passes the tuning fork test 1104, a transmission frequency stability test 1106 is performed. For the transmission frequency stability test 1106, the transmitted frequency is required to stay within a designated frequency band for a supply voltage to the device within a range of +/−20% of the standard supply voltage.

If the unit passes the transmission frequency stability test 1106, a power density test 1108 is performed. For the power density test 1108, the technician measures the near-field power density of the antenna at a predetermined distance in front of the antenna. The power density of the antenna may not exceed a maximum signal strength, such as 5 mW/cm$^2$.

If the unit passes the power density test 1108, then a low-voltage test 1110 is performed. For the low-voltage test 1110, the tuning fork test 1104 described above is performed while the supply voltage to the device is lowered to 20% of the standard supply voltage, or to a predetermined minimum voltage. As the voltage is lowered, the speed displayed should be consistent and accurate at the minimum voltage.

If the unit passes the low-voltage test 1110, then a Doppler audio test 1112 is performed. The Doppler audio test 1112 includes utilizing a speed simulator and listening for a tone corresponding the speed reading of an approaching vehicle at a particular speed, and a tone corresponding to the speed reading of a receding vehicle at a particular speed.

If the unit passes the Doppler audio test 1112, an internal circuit test 1114 is performed. The internal circuit test 1114 is performed in accordance with the instructions of the device manufacturer.

If the unit passes the internal circuit test 1114, then a directional sensing test 1116 is performed. The directional sensing test 1116 is performed utilizing a speed simulator and verifying correct display of the speed reading of an approaching vehicle at a particular speed, and correct display of the speed reading of a receding vehicle at a particular speed.

If the unit passes the directional sensing test 1116, then the low and high speed display test 1118 is performed. The low and high speed display test 1118 verifies that the device accurately displays a minimum speed, such as 20 mph, and a maximum speed, such as 199 mph, for example.

If the unit passes the low and high speed display test 1118, then the RFI test 1120 is performed. The RFI test 1120 subjects the device to various electromagnetic frequencies and wave forms and verifies that the device consistently and accurately displays the simulated speed of a vehicle.

If the unit passes the RFI test 1120, the unit is certified by the technician 1122. Other tests may be performed as required by the manufacturer, certifying agency, or state law.

In the preferred embodiment, the invention would provide a certification utility application to the certifying facility. At the completion of the certification process shown in FIG. 17 the radar or laser traffic device may be connected to an intelligent device running the certification utility application.

Figure 18:
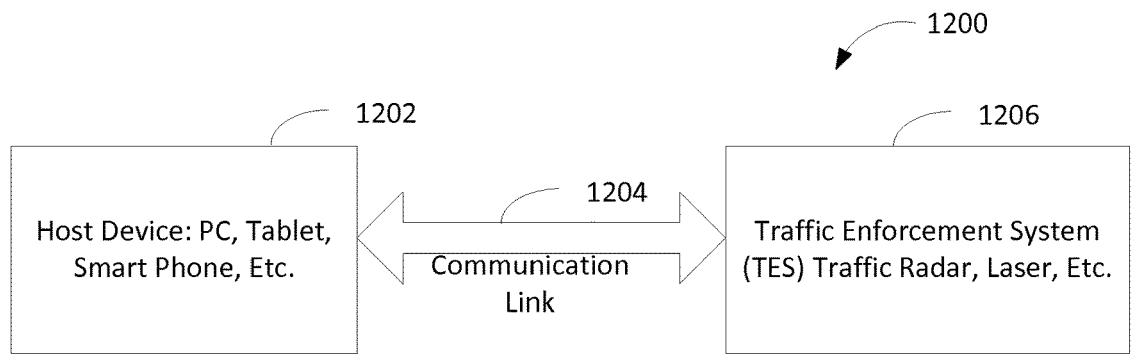
FIG. 18 is a diagram a host device interfaced to a traffic enforcement system.

Referring to FIG. 18, an example of connecting the radar or laser device to the intelligent device is generally indicated by reference numeral 1200. The host device 1202 may be a PC, tablet, smart phone, or any intelligent device capable of running the certification utility application. Host device 1202 is connected to the TES unit or traffic enforcement system (TES) 1206, via a communication link 1204. This communication link 1204 may be cable connection such as serial communications port, universal serial bus (USB), or it may be a wireless link such as Bluetooth or WiFi.

Figure 19:
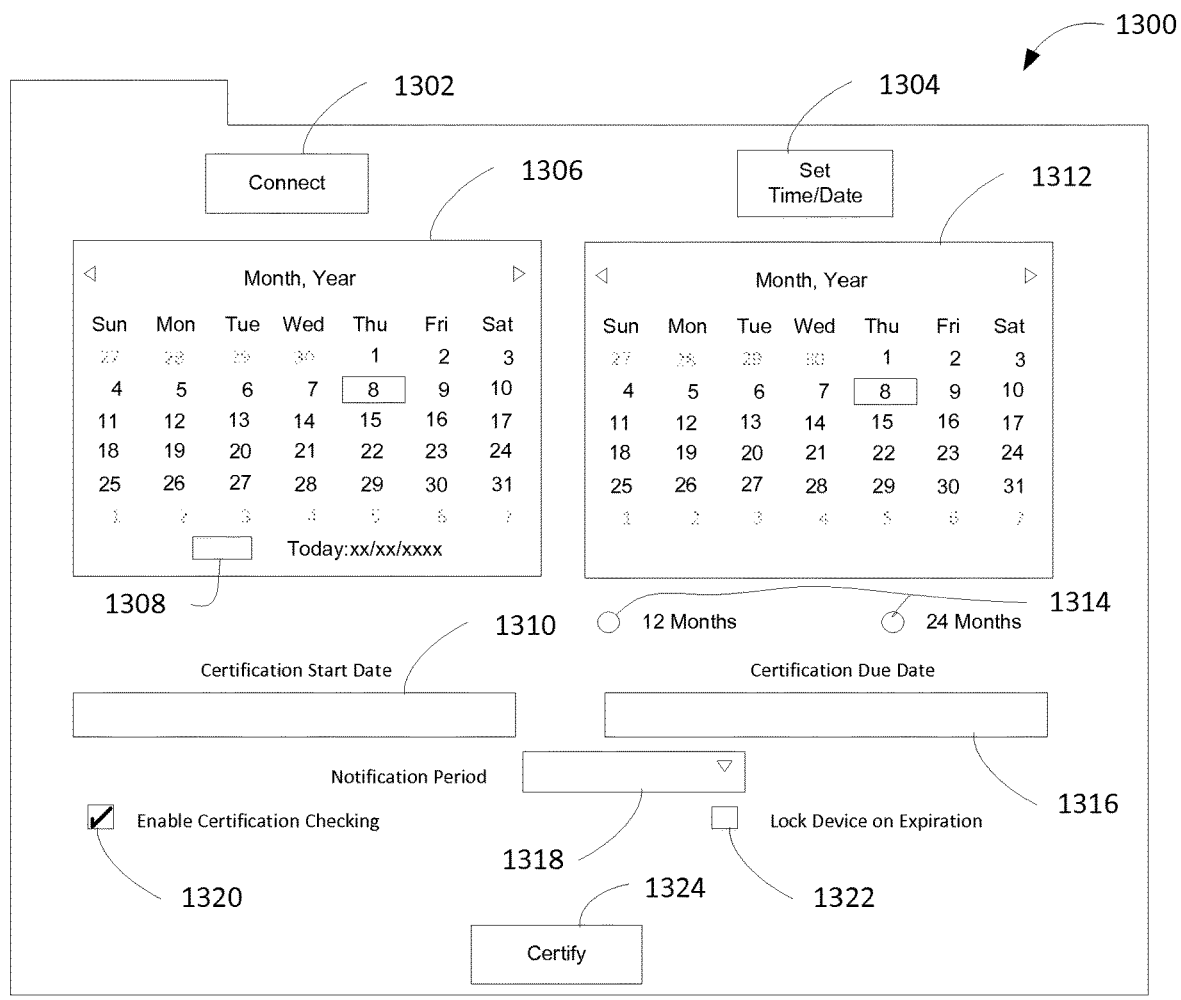
FIG. 19 is a diagram of a certification utility application.

Referring to FIG. 19, an example screen display of the certification utility application of the preferred embodiment, running on the host device, is generally indicated by reference numeral 1300. A technician may establish a communication between the host device and the TES 1206 by pressing a connect button 1302. Information may now be shared between the host device and the TES 1206. The technician may want to update the Time/Date in the TES 1206 to the current Time/Date in the host device by pressing the Set Time/Date button 1304. The technician may then set the date on which the current certification was completed. This may be done by clicking a date in the calendar view 1306 or by clicking today's date box 1308. The certification start date will then be displayed in the text box 1310. The technician may then set the date on which the current certification will expire. This may be done by clicking a date in the calendar view 1312 or by selecting a preset period for the certification period 1314. The next certification due date will be displayed in the text box 1316. At this time, a notification period may be selected 1318. This parameter is the number of days prior to the expiration of the certification 1316 to have the TES 1206 start warning the operator the certification renewal is near. Several presets may be available from the drop down box 1318 or the technician may just enter a number of days in box 1318. Check box 1320 may be selected by the technician to enable or disable the certification checking by the TES 1206. Check box 1322 may be used to control how the TES 1206 behaves if the certification is allowed to expire. If the box is checked the TES 1206 will not operate if the certification has expired. If left unchecked, the TES 1206 will warn the operator the certification has expired and the operator must press a button to bypass the warning. Once the above settings are made, the technician may press the Certify button 1324 and the certification information is sent to the TES 1206. Optionally, pressing the Certify button 1324 may also update the Time/Date in the TES 1206 to the current Time/Date in the host device.

Figure 20:
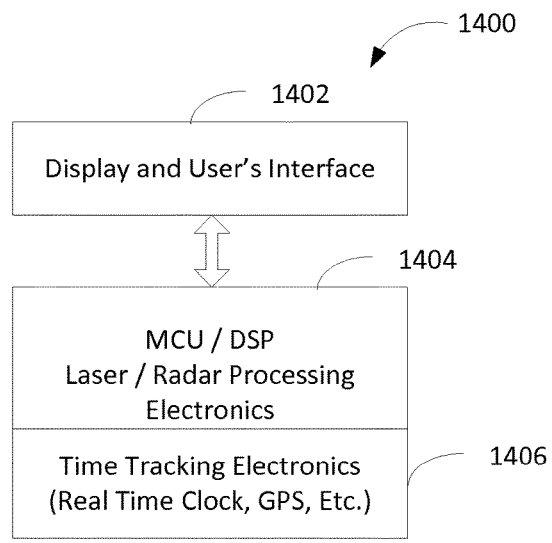
FIG. 20 is a simplified diagram of a TES with time tracking added.

In the embodiment of the present invention, an electronics circuit, firmware, or software to track the current time and date may be added to the TES 1206 unit to track when the system is required to be recertified by a test facility. The TES as depicted in FIG. 20 reference 1400 is an example of the system with the time tracking circuitry added. Block 1402 depicts the display and user interface. In the preferred embodiment, the invention shows the status of the systems certification on this display 1402. The system's electronics board containing microprocessors such as a micro controller unit (MCU), or a digital signal processor (DSP), or both is indicated by reference numeral 1404. In the preferred embodiment, the certification information may be processed and stored by the processors in block 1404. Block 1406 depicts the added time tracking circuit (real time clock, GPS module, etc.) that communicates with the processors in block 1404. An example of the time tracking circuitry used in a TES unit may include the PCF2129AT integrated circuit (IC) provided by NXP semiconductors.

Figure 21:
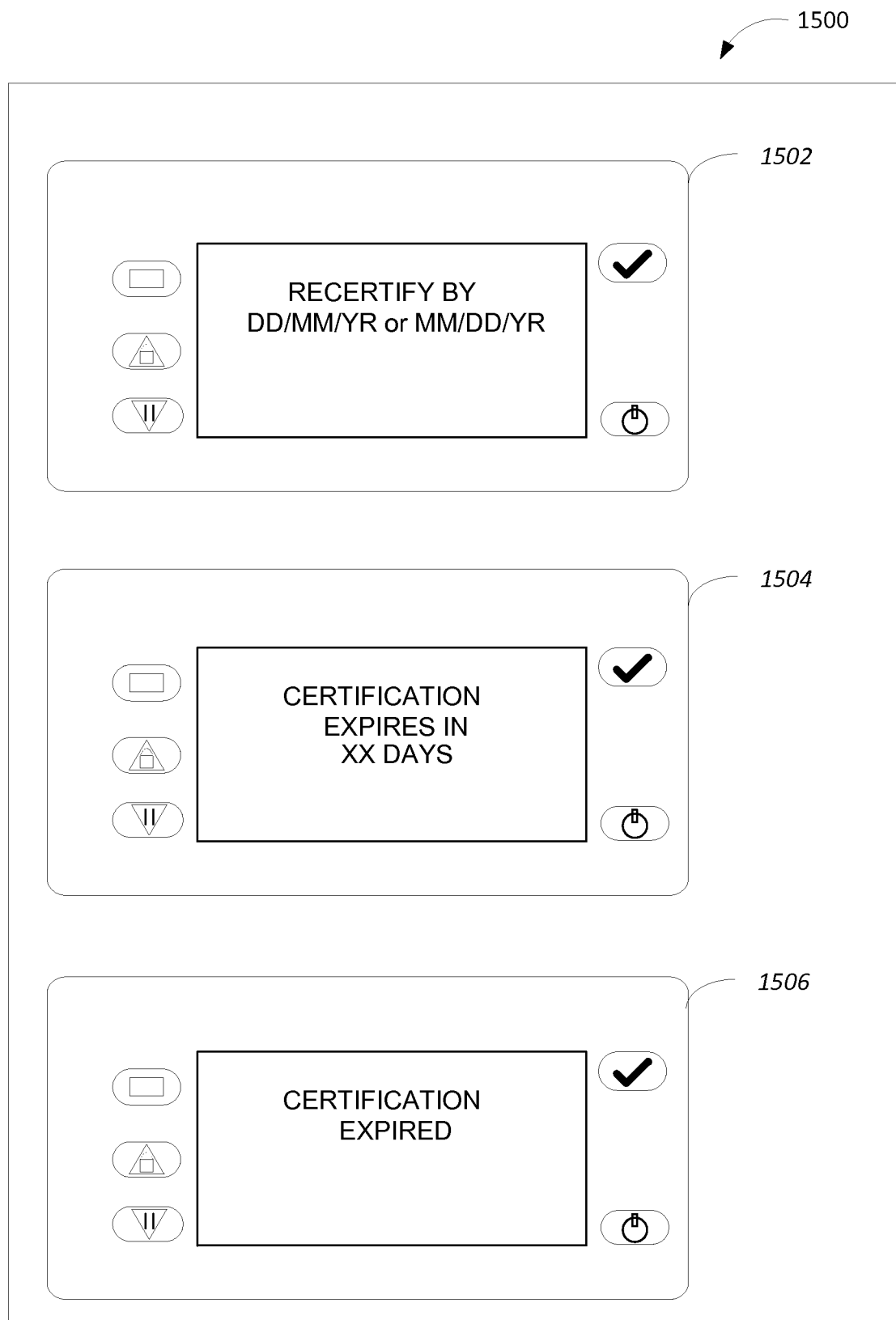
FIG. 21 illustrates examples of certification display screens.

The firmware loaded in the TES unit electronics processing board 1404 may display information about the systems certification to the operator via the system display 1402. FIG. 21 shows examples of the certification information provided to the operator as illustrated on a radar system 1500. During the power-up sequence, the date of the required recertification is displayed 1502. If the days remaining prior to the required recertification has fallen to within the notification period as set by the certifying technician, screen 1504 will be displayed, notifying the operator of the number of days before the certification expires. This screen may remain on the display until the operator acknowledges the message by pressing one of the front panel switches. Screen 1506 will be displayed if the certification date has elapsed. This notifies the operator the system is no longer in certification. Depending on the option set by the certification technician, the operator may acknowledge this message by pressing a front panel switch and continue to operate or the system firmware would set the unit inoperable until the Certification Utility was use to reset the certification of the system.

It is to be understood that while certain now preferred forms of this invention have been illustrated and described, it is not limited thereto except insofar as such limitations are included in the following claims. Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

What is claimed is:

1. A method for operation of a traffic enforcement system device, the method comprising:
   transmitting an electromagnetic signal at a moving target vehicle and receiving a return electromagnetic signal therefrom;
   determining a distance to said moving target vehicle from said transmitted and return electromagnetic signals;
   automatically focusing a camera on said moving target vehicle based on said determined distance;
   automatically zooming said camera in on said moving target vehicle based on said determined distance such that an image of said moving target vehicle substantially fills a field of view of a display of said camera;
   periodically redetermining another distance to said moving target vehicle and automatically rezooming and refocusing said camera based on said redetermined distance to maintain said image of said moving target vehicle substantially within said field of view of said camera;
   determining target data for said moving target vehicle for a predetermined period of time;
   displaying said target data on said camera display;
   capturing one or more images of said moving target vehicle; and
   storing said one or more images and corresponding target data of said moving target vehicle.

2. The method of claim 1, wherein said electromagnetic signal is a laser signal.

3. The method of claim 1, wherein said electromagnetic signal is a microwave signal.

4. The method of claim 1, wherein said camera is a digital camera.

5. The method of claim 1, wherein said camera is a video camera.

6. The method of claim 1, wherein said periodically redetermining step is continuously.

7. The method of claim 1, wherein said target data includes the speed of said moving target vehicle.

8. The method of claim 1, wherein said target data includes a compass heading of said moving target vehicle.

9. The method of claim 1, wherein said target data includes a geographic position of said moving target vehicle.

10. The method of claim 1, wherein if said period of time is less than a minimum period of time, skipping said storing step.

11. The method of claim 1, further comprising storing a certification date corresponding to a certification of said traffic enforcement system device.

12. The method of claim 11, further comprising storing an expiration date of said certification.

13. The method of claim 12, further comprising storing a time period before said expiration date, wherein an indication is displayed on said camera display during said time period.

14. The method of claim 12, further comprising storing a time period before said expiration date, wherein an audio indication is output from said traffic enforcement system during said time period.

15. The method of claim 12, wherein an indication is displayed on said camera display after said expiration date is reached.

16. The method of claim 12, wherein said traffic enforcement system is disabled after said expiration date is reached.

* * * * *